US009361440B2

(12) United States Patent
Kramer

(10) Patent No.: US 9,361,440 B2
(45) Date of Patent: Jun. 7, 2016

(54) SECURE OFF-CHIP PROCESSING SUCH AS FOR BIOMETRIC DATA

(75) Inventor: Alan Kramer, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 1070 days.

(21) Appl. No.: 11/963,637

(22) Filed: Dec. 21, 2007

(65) Prior Publication Data
US 2009/0164797 A1 Jun. 25, 2009

(51) Int. Cl.
G06F 21/32 (2013.01)
H04L 29/06 (2006.01)
H04L 9/32 (2006.01)
G06K 9/00 (2006.01)

(52) U.S. Cl.
CPC .............. *G06F 21/32* (2013.01); *H04L 9/3231* (2013.01); *H04L 63/0861* (2013.01); *G06K 9/00885* (2013.01); *G06K 2009/00959* (2013.01)

(58) Field of Classification Search
CPC .... G06F 21/32; H04L 63/0861; H04L 9/3231
USPC ........................................................ 713/186
See application file for complete search history.

(56) References Cited

U.S. PATENT DOCUMENTS

| 6,167,517 | A  | * | 12/2000 | Gilchrist ............... G06F 21/32 713/182 |
| 6,505,193 | B1 | * | 1/2003 | Musgrave ............... G06F 21/32 |
| 6,580,816 | B2 |   | 6/2003 | Kramer et al. |
| 6,910,132 | B1 | * | 6/2005 | Bhattacharya ............... 713/186 |
| 7,107,220 | B2 | * | 9/2006 | Novack et al. ............... 704/273 |

(Continued)

FOREIGN PATENT DOCUMENTS

| EP | 1480105 A | 11/2004 |
| EP | 08153661  | 3/2008 |

(Continued)

OTHER PUBLICATIONS

Chao, Gwo-Cheng; Lee, Shung-Shing; Lai, Hung-Chuan; Horng, Shi-Jinn; "Embedded Fingerprint Verification System", 11th International Conference on Parallel and Distributed Systems, Jul. 22, 2005, IEEE, pp. 52-57.*

Pan, Sung Bum; Moon, Daesung; Kim, Kichul; Chung, Yongwha; "A VLSI Implementation of Minutiae Extraction for Secure Fingerprint Authentication", International Conference on Computational Intelligence and Security, Nov. 3-6, 2006, IEEE, vol. 2, pp. 1217-1220.*

*Primary Examiner* — Victor Lesniewski
(74) *Attorney, Agent, or Firm* — Allen, Dyer, Doppelt, Milbrath & Gilchrist, P.A.

(57) ABSTRACT

In a biometric sensor system and method, storage of acquired biometric data and/or processing of that data may be shifted from specialized secure processing hardware to host system resources for improved speed and reduced cost of biometric sensor devices and systems. Stored data may be encrypted and/or signed by the specialized secure processing hardware and/or software. A database of authorized biometric data (e.g., patterns or key features representing all or a portion of the fingerprints of authorized users) may be stored on the host system either encrypted or non-encrypted or both. Preliminary matching against a database of many enrolled fingerprints may be accomplished by the system processor to ease the processing burden on the specialized secure processing hardware/software. Final match confirmation remains within exclusive control of the specialized secure processing hardware/software in order to prevent data tampering or other efforts to defeat the security provided by biometric identification.

12 Claims, 13 Drawing Sheets

(56) References Cited

U.S. PATENT DOCUMENTS

| | | | |
|---|---|---|---|
| 7,174,463 B2* | 2/2007 | Cromer et al. | 713/186 |
| 7,404,086 B2* | 7/2008 | Sands et al. | 713/186 |
| 7,415,605 B2* | 8/2008 | LaCous | 713/150 |
| 7,424,618 B2* | 9/2008 | Roy et al. | 713/186 |
| 7,506,818 B2* | 3/2009 | Beenau | G06F 17/30725 235/380 |
| 7,587,611 B2* | 9/2009 | Johnson et al. | 713/186 |
| 7,805,614 B2* | 9/2010 | Aull et al. | 713/186 |
| 7,809,211 B2 | 10/2010 | Taraba et al. | |
| 7,826,645 B1* | 11/2010 | Cayen | 382/124 |
| 7,962,173 B2* | 6/2011 | Oshima | G06F 3/002 361/679.23 |
| 8,001,387 B2* | 8/2011 | Lee et al. | 713/186 |
| 8,443,200 B2* | 5/2013 | Karthik | G06F 21/32 713/186 |
| 8,509,493 B2* | 8/2013 | Oka | G06F 21/32 382/115 |
| 2001/0025342 A1* | 9/2001 | Uchida | 713/186 |
| 2002/0184509 A1* | 12/2002 | Scheidt | G06F 21/31 713/185 |
| 2003/0070079 A1* | 4/2003 | Cromer et al. | 713/186 |
| 2003/0088782 A1 | 5/2003 | Forrest | |
| 2004/0128520 A1* | 7/2004 | LaCous | 713/186 |
| 2004/0199775 A1* | 10/2004 | Ser et al. | 713/186 |
| 2005/0210269 A1* | 9/2005 | Tiberg | 713/186 |
| 2005/0229007 A1* | 10/2005 | Bolle et al. | 713/186 |
| 2005/0240779 A1* | 10/2005 | Aull et al. | 713/186 |
| 2005/0244037 A1* | 11/2005 | Chiu | G06F 21/32 382/124 |
| 2006/0288182 A1* | 12/2006 | Chou | G06F 21/32 711/163 |
| 2007/0079138 A1 | 4/2007 | Chou | |
| 2007/0106903 A1* | 5/2007 | Scheidt | G06K 9/00006 713/182 |
| 2007/0136604 A1* | 6/2007 | Kuhlman | H04L 63/08 713/186 |
| 2007/0220274 A1* | 9/2007 | Jensen et al. | 713/186 |
| 2007/0250718 A1* | 10/2007 | Lee et al. | 713/186 |
| 2007/0253601 A1* | 11/2007 | Kaleedhass et al. | 382/115 |
| 2008/0005586 A1* | 1/2008 | Munguia | 713/189 |
| 2008/0065901 A1* | 3/2008 | Takaku et al. | 713/186 |
| 2008/0120509 A1* | 5/2008 | Simon | 713/186 |
| 2008/0155268 A1* | 6/2008 | Jazayeri et al. | 713/186 |
| 2008/0313726 A1* | 12/2008 | Gardner | H04L 9/3273 726/9 |
| 2009/0067685 A1 | 3/2009 | Boshra et al. | 382/124 |
| 2009/0067686 A1 | 3/2009 | Boshra et al. | 382/124 |
| 2009/0067687 A1 | 3/2009 | Boshra et al. | 382/124 |
| 2009/0067688 A1 | 3/2009 | Boshra et al. | 382/124 |
| 2009/0067689 A1 | 3/2009 | Porter et al. | 382/124 |
| 2009/0070592 A1 | 3/2009 | Boshra et al. | 713/186 |
| 2009/0070593 A1 | 3/2009 | Boshra et al. | 713/186 |
| 2009/0164797 A1 | 6/2009 | Kramer | 713/186 |

FOREIGN PATENT DOCUMENTS

| | | |
|---|---|---|
| WO | PCT/US00/10415 A1 | 11/2000 |
| WO | WO 01/23980 A | 4/2001 |
| WO | WO 03/007127 A | 1/2003 |
| WO | WO 2004/006495 A | 1/2004 |

* cited by examiner

SECURE OFF-CHIP PROCESSING SUCH AS FOR BIOMETRIC DATA

BACKGROUND OF THE INVENTION

1. Field of the Invention

The present invention is related to secure data processing, and more specifically to methods and apparatus for securely employing resources external to a secure biometric data acquisition system to assist with storage and processing of acquired user biometric data.

2. Description of the Prior Art

The use of biometric data for identification and/or authentication of an individual has been and continues to be a popular security tool. For example, since fingerprints are unique to each individual, methods and devices have been developed to acquire and compare characteristics of the surface or structure of the skin at or proximate a user's fingertip and, from that data, generate user biometric data representing the user's fingerprint pattern. The fingerprint pattern (commonly referred to as a fingerprint) is compared to other patterns in a library of enrolled patterns for the purposes of authenticating an individual, verifying identity, granting access to a computer, room or building, etc. In certain devices and systems, fingerprint pattern data is obtained by passing a fingertip over a sensor, which captures multiple partial "images" of the fingertip, which are assembled or normalized into a single composite image for further analysis. In other systems, other biometric image data may be acquired and used for security purposes.

A feature template is typically formed from the acquired biometric image data. The features for the template may be image data from an entire fingerprint image, selected minutiae extracted from the image data, or some other feature of interest. The feature template is compared to one or more stored enrolled biometric templates which represent previously enrolled (or registered) fingerprint data. A secure biometric access system permits or denies access to files, facilities, etc. based on the sufficiency of a match between the feature template and any one of one or more enrolled biometric templates.

Operating on a template, as opposed to a full fingerprint image, greatly reduces system memory and processing demands, and greatly speeds up the comparison process. However, creation of the template generally places additional time, processing, and memory demands on computational resources. Additional details surrounding the computational requirements for the generation of templates are discussed further below.

In many systems, measures are taken to protect the acquired biometric image data, enrolled data, and the comparison and analysis process, often stored and processed on special hardware, from fraud and improper tampering and use. Often this protection involves isolating the secure biometric data acquisition, storage, and analysis elements from the host system's processor and memory, which are often not secure, and are vulnerable to compromise from such attacks as computer viruses, hacking, etc. Therefore, systems which resist compromise by computer viruses and other security attacks and in which the comparison and analysis process takes place on specialized hardware resources are often referred to as secure biometric data processing systems. As data provided directly by secure biometric data processing systems is protected against tampering, fraud, viruses, etc., such data is referred to herein as trusted data. Data provided by data processing systems other than the secure variety may have been tampered with, contain viruses, or otherwise be compromised in such a manner that a biometric match result may not be trusted. Accordingly, data provided by sources other than secure biometric data processing systems is referred to herein as untrusted data.

Typically, biometric data analysis proceeds more slowly than data acquisition. Therefore, significant memory resources are required to buffer the data received from the biometric sensor in real time prior to further processing. For example, as a fingertip is scanned and data representing the fingerprint is generated it must be stored securely in real time for later analysis and identification. (While part of the incoming data may be used in the biometric analysis process, additional data will be incoming and must be stored until needed in the ongoing analysis process.) Alternatively, all data may be obtained prior to beginning any biometric data analysis. Either way, data storage resources are required to buffer data in a manner that maintains its trustworthiness until needed in the analysis process. The volume of raw biometric data can be quite large, and therefore significant storage resources may be required. As an example, the NIST storage requirement for an 8-bit, 1-inch square fingerprint image is 250 Kbytes at an image resolution of 500 dots per inch (dpi).

Typical elements required for biometric identification include a sensor device for example for acquiring an image of a fingerprint, a processor for performing data analysis, and various memory elements for storing raw image data, processed image data, features and enrolled biometric templates, etc. In theory, the processor for performing the biometric data analysis can be a generic processor shared by other system resources or form part of a dedicated, specialized custom integrated circuit. That is, the processor and memory performing the data analysis may be part of a general purpose computer system within which a biometric sensor operates, or may be an integral component of the biometric sensor system itself. The use of general purpose processors, such as a personal computer's CPU, and generic memory, such as a personal computer's RAM and hard disk drives, is inexpensive but does not typically isolate the biometric image process from the host system, and thus renders any data untrustworthy and vulnerable to compromise from threats such as computer hacking. Custom security hardware offers better protection from hacking, but is more expensive than generic computer system resources because of the need for dedicated hardware resources.

In practice, security concerns prevail, and fingerprint data is typically maintained in a trusted manner by buffering and processing on dedicated, custom digital hardware connected to the sensor device. Such memory and processing hardware are isolated from the host system both physically and by electronic security measures such as encrypted communication, etc.

For example, one class of biometric identification devices include a sensor chip positioned on one surface of a carrier. Disposed elsewhere on the carrier are a data processor and memory. These components are operable within a host system such as a personal computer, cell phone, door lock, etc. These components are further coupled to one another such that as a user slides a fingertip across the surface of the sensor chip multiple partial images of the user's fingerprint are captured and are delivered to the memory. The processor may then access the images in the memory, and by one or more of a number of techniques, process them and compare them to one or more previously enrolled biometric templates in order to determine if the user's live fingerprint matches an enrolled fingerprint. The results of the comparison are then provided to the host system, requesting server, or other element of the overall system employing fingerprint identification. No other system access to the biometric identification device processor or memory is permitted. However, such a dedicated hardware solution has heretofore been expensive and memory-constrained compared to generic computing resources.

The dilemma faced by biometric systems developers has been the forced choice between general systems that are less than sufficiently secure, and secure systems which significantly add to the cost of the overall system. Specifically, it has historically been a challenge to provide a biometric sensor device with sufficient secure memory resources to handle the buffering required for data acquisition and fingerprint analysis without adding significant cost for dedicated hardware, memory, etc. to the cost of the overall system.

SUMMARY OF THE INVENTION

Accordingly, the present invention is directed to architectures and techniques for secure storage and processing of biometric information using otherwise available host system resources. The present invention has broad application to any biometric security system, particularly where the amount of biometric data which is collected and processed is extensive, and buffering is required between the collecting, processing, final identification procedures, and/or any intermediate procedures involving the overall process of collecting and authenticating user biometric data.

According to one aspect of the invention real-time data encryption and/or real-time data signing is employed upon data input to allow biometric input data to be secured electronically in real-time before being sent, for example, to general system storage for buffering within lower cost memory resources available at the host system level. This secured general system storage can then be accessed at a later time and at a different speed compared to the time and pace of real-time biometric data acquisition. One advantage of this architecture and technique is to provide a high level of hardware-based biometric security at a substantially reduced cost.

A biometric data processing system, as used herein, is comprised of specialized secure processing hardware and appropriate software operable thereon associated with a biometric data acquisition device. Such hardware can be comprised of several communicatively coupled integrated circuits on one or several circuit boards, or alternatively as a single integrated circuit—a "system on a chip," or SOC—for data processing and/or storage, etc. Typically, such specialized secure processing hardware will be used in association with other general purpose or "host" computing and storage resources, referred to as host processor systems, such as a generic personal computer system having a processor, random access memory (RAM), and other memory resources such as hard disk drives, etc. Data processing and/or storage conducted by or on the specialized secure processing hardware is referred to herein as "on-chip," while processing and/or storage using the general purpose host processor system and/or memory such as RAM or hard disk memory is referred to as "off-chip" (although the specialized secure processing hardware need not be a single chip, per se, and some or all of the secure storage may be off-chip from the secure processor in a multi-chip configuration).

By performing real-time data encryption and/or real-time data signing the present invention facilitates biometric input data to be secured electronically in real-time before being sent off-chip for buffer storage and/or processing within lower cost memory and computing resources available at the host system level. The data stored in secure off-chip storage can then be accessed at a later time and at a different speed as compared to the time and pace of biometric data acquisition which must be performed in real time.

According to another aspect of the present invention, a process and associated architecture are disclosed which includes the step of and structure for securing a unique, temporary secret (private) session key within the specialized secure processing hardware associated with the biometric data acquisition device. By encoding with a temporary, unique key for each session, a high level of encryption and/or electronic data signing security is provided. This further allows the speed of real-time biometric data acquisition to be decoupled from the slower speed of biometric data analysis and matching while maintaining a very high level of security against fraud and misidentification.

According to various embodiments of the present invention, all data stored off-chip is secured by way of encryption or digital signature. According to other embodiments of the present invention, some or all of the data stored off-chip is not encrypted nor digitally signed, but available to off-chip resources for data processing. In such embodiments, means are provided for using/verifying any effectively untrusted data returned from such off-chip resources.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

The present invention may be realized in the form of a number of different embodiments, certain of which are described herein. Common to these embodiments is the concept that user biometric input data is gathered on secure hardware, stored and/or processed off-chip (for example, on the hard disk of a host computer), and returned later to the secure hardware for, for example, processing, analysis and/or storage.

Figure 1:
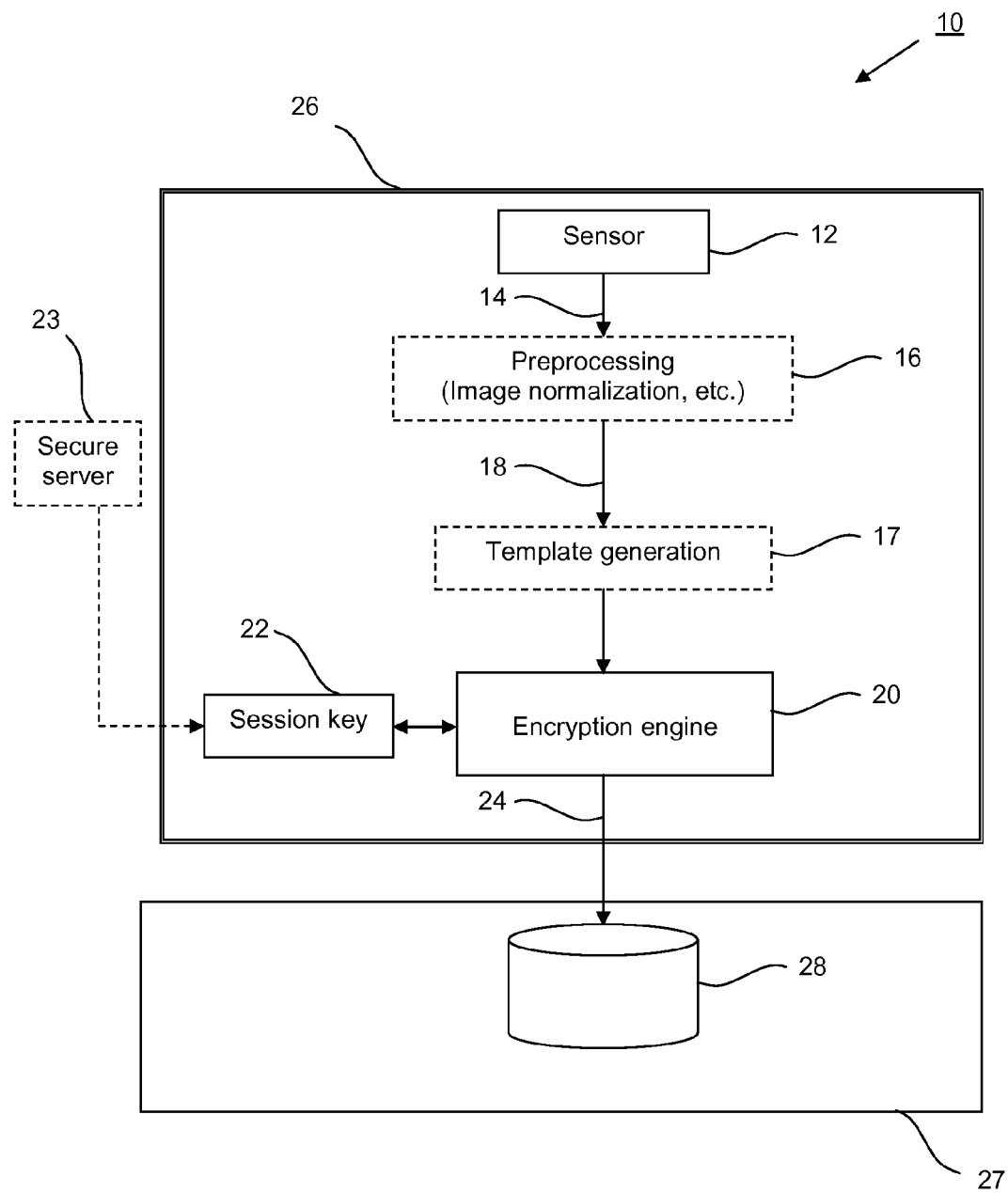
FIG. 1 is an illustration of secure hardware and software employed to gather user biometric data and perform real-time data encryption and/or data signing, and non-secure system-level storage for receiving and storing the encrypted user biometric data during a real-time biometric data acquisition phase according to one embodiment of the present invention.

FIG. 1 illustrates one exemplary embodiment 10 of the fundamental process. According to embodiment 10, one of a wide variety of electrical, optical, pressure or other sensing devices 12, such as the scanning capacitive semiconductor fingerprint detector disclosed in U.S. Pat. No. 6,580,816 (incorporated herein by reference), obtains user biometric data, such as a scanned image(s) of a fingerprint. This obtained user biometric data 14 may optionally be subject to preprocessing, such as image normalization (as taught by U.S. patent application Ser. No. 11/561,239, incorporated herein by reference), or other data conditioning by on-chip preprocessing hardware and software 16. (Here and elsewhere in this disclosure an element or step represented by a dashed line is an optional element or step.) Optionally, a biometric template may be generated at 17 from the user biometric data, such as the location of selected minutiae from within fingerprint image data. At this point, for security and authenticity of the user biometric data, any preprocessing of data 14 occurs by and within the specialized secure processing hardware 26.

According to this embodiment, the processed user biometric data 18 may then be operated on by an on-chip encryption engine 20. Any of a wide variety of encryption techniques may be employed to create securely encrypted data. One characteristic of encryption techniques is the use of an encryption "key" permitting authorized decryption of encrypted data. Thus, an encryption key is typically employed by encryption engine 20 during the encryption process. According to one example of this embodiment, for security the key may be specific to each identification event or "session", and is therefore referred to as a "session key" 22. (A permanent or device specific key may be employed in alternate embodiments.) A session key may be generated randomly within specialized secure processing hardware 26, by a pre-determined algorithm tied to a unique and secret "seed" within the secure hardware, obtained in a secure fashion (for example to provide audit ability for the encrypted data) from outside the secure hardware, for example from a server 23, or other appropriate technique.

According to embodiment 10 (as one example), session key 22 resides within the specialized secure processing hardware 26. Thus, according to this embodiment, the encryption may be single-key encryption of an appropriate bit length. It is, however, within the scope of the present invention to also use more sophisticated encryption technologies, in which case two-key or public-key encryption could optionally be employed. In either case, the output from encryption engine 20 is secure encrypted data 24 which may then be delivered to non-secure host system 27, e.g., to the host system memory 28, for temporary storage. Though system memory 28 is not in-and-of itself secure, the encrypted user biometric data remains trusted by way of its encryption.

It is noted that one feature of the present invention is the reduction in on-chip resources, such as memory, required for biometric data acquisition and analysis. In order to accomplish this reduction of on-chip resources, the encryption rate cannot be significantly slower than the data acquisition rate. That is, the encryption (and possible preprocessing) occurs in so-called "real time." Common encryption engines are quite capable of this rate of data encryption. An exemplary data acquisition rate for a commercial fingerprint sensor is on the order of 2 Mbytes/sec, well within the rate of symmetric encryption (AES, 3DES, etc.) Some limited buffering may take place during the preprocessing or encryption, but by performing these functions at or near the data acquisition rate, on-chip memory requirements may effectively be reduced or minimized.

Furthermore, readily available generic memory systems, such as those of a modern general purpose personal computer are also able to store incoming data as fast as a typical biometric sensor can produce it, so data can be gathered, encrypted, and stored on generic hardware all in real time. No special adaptation of the generic system memory is required to receive the encrypted user biometric data, which is stored in encrypted form.

With session key 22 securely stored on specialized secure processing hardware 26, the encrypted user biometric data now stored on non-secure host system 27 is protected from unauthorized access and tampering. As described below, the encrypted data stored on non-secure host system 27 is subsequently processed by a decryption engine using the session key 22. If any but the authentic data is so decrypted, no match to an authorized user can be made. Thus, efforts to introduce fraudulent data into communications between the specialized secure processing hardware 26 and the non-secure host system 27 in an attempt to defeat the security of a secure biometric access system will not be successful.

Figure 2:
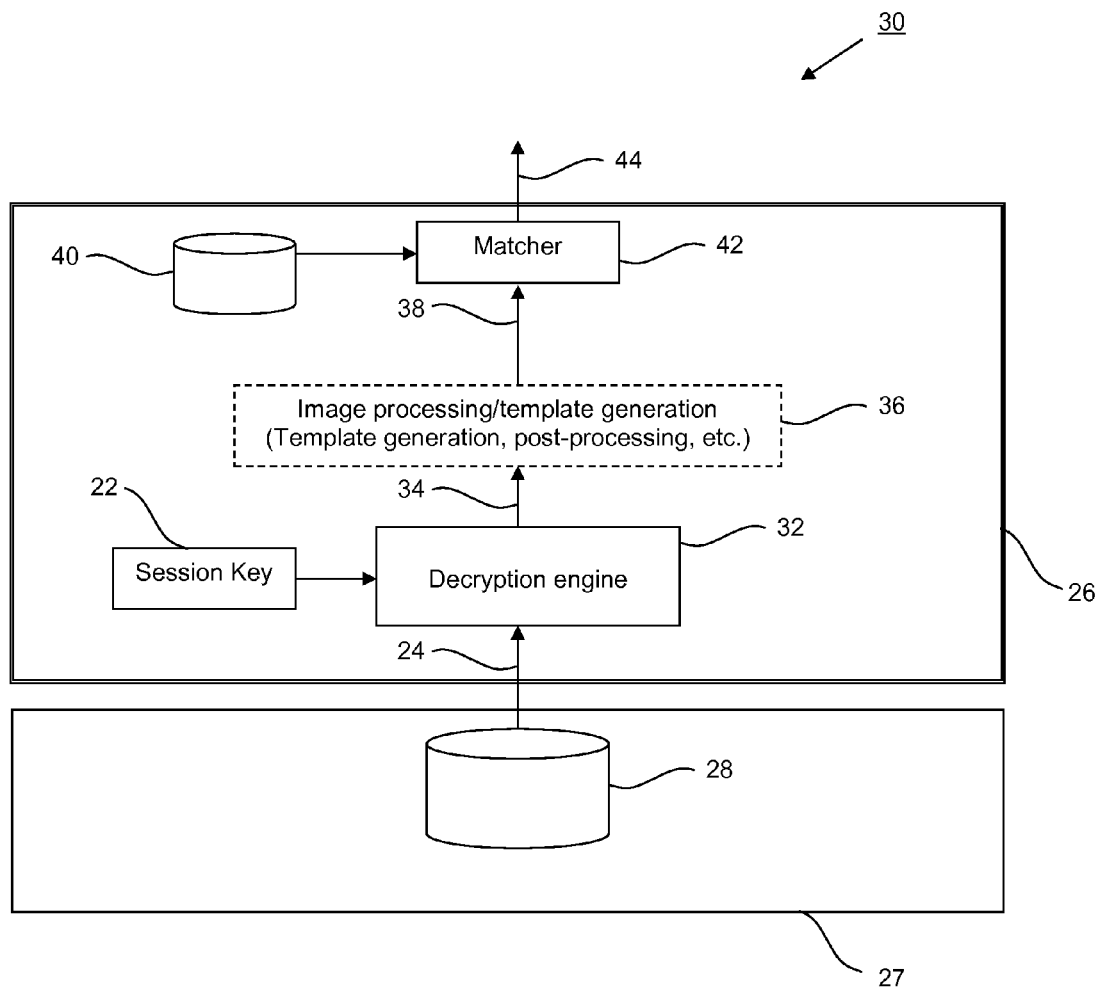
FIG. 2 is an illustration of secure hardware and software and non-secure system-level storage for retrieving encrypted user biometric data stored on the non-secure system-level storage and for decrypting and verifying the user biometric data against authorized data other than exclusively during the data acquisition phase according to one embodiment of the present invention.

Accordingly, in another embodiment 30 of the present invention, and as an adjunct to embodiment 10 for encrypting user biometric data, the encrypted user biometric data 24 stored on non-secure host system 27 is requested by the specialized secure processing hardware 26 (either as a single packet of information or in smaller sub-packets) for decryption and analysis. This embodiment is illustrated in FIG. 2. Based in part on the requisite matching of the user biometric data against reference data (or alternatively, template matching), this second phase of processing typically proceeds at a slower rate than data acquisition/encryption. However, many applications of biometric data analysis such as password authentication, barrier entry, personal identification, etc., do not require data analysis to take place in real time (i.e., immediately as the user biometric data is acquired) nor to be synchronized with the data acquisition/encryption. Accordingly, the delivery of encrypted data 24 for decryption and analysis according to embodiment 30 takes place following but independently from the data acquisition and encryption of embodiment 10.

According to embodiment 30, encrypted user biometric data 24 is delivered to a decryption engine 32. In order to decrypt data 24, decryption engine 32 requires access to session key 22 used when the data was encrypted. The output of decryption engine 32 will be decrypted user biometric data 34. This data may be the raw data obtained from the sensor 12 of embodiment 10, or may be preprocessed data or a biometric template (e.g., according to embodiment 10) to enhance the quality and efficiency of the data analysis. Decrypted user biometric data 34 may be processed by image processing hardware/software 36, for example for the generation of a template from an image for fingerprint matching. The processed image data (or template) 38 is then analyzed to determine whether a sufficient number of features of the scanned image match features of an enrolled image (or enrolled biometric template) stored in a database 40 on secure processing hardware 26. If a sufficient number of matching features are identified, the scanned image is found to match an enrolled biometric template, a match or pass indication 44 may be output by a matcher 42 for use by secondary hardware or software (not shown) such as a password check, mechanical door lock, etc., possibly to be securely communicated with the use of encryption or other security protocols so that only the intended recipient knows the result of the match. If a sufficient number of matching features are not identified such that there is no matching to an enrolled biometric template found in memory 40, a non-match indication may be issued, and handled in a variety of ways which are beyond the scope of the present invention. As an alternative to database 40 and matcher 42 being located on-chip, there may be copies of the database 40 and/or a matcher located off chip, as discussed further below.

Alternatively, it may be desirable to employ a digital signature protocol to ensure against fraudulent attempts to circumvent a secure biometric identification system. Such signature protocols are well known in the art (e.g., HMAC). In such an embodiment, the user biometric data may be hashed together with a session key 22 to create a "keyed hash". The signing process does not encrypt the data, but rather appends the keyed hash "signature" to the data which then may be used to determine if the data is authentic or has been altered. Signed data may also be encrypted, but need not be in all embodiments. The advantage of signing is that it provides the host system with visible data, allowing the host to operate on that data (e.g., template generation), yet provides the secure processing hardware 26 with the ability to detect tampering with the data or the introduction of fraudulent data into the communication pathway between the host system 27 and the secure processing hardware 26.

Thus, in combination, embodiments 10 and 30 provide a method and system by which user biometric data is acquired, encrypted (or digitally signed), stored separate from the secure biometric data system, recalled back into the secure biometric system, decrypted (or signature verified), then examined for a match to reference data. Non-secure host memory may be employed to buffer the secure encrypted user biometric data, allowing it to later be delivered in trusted form back to the specialized secure processing hardware. Secure decryption may then take place on the specialized secure processing hardware at a pace that is best suited to the analysis and matching operations of the secure biometric system. All encryption and decryption takes place on specialized secure processing hardware 26. Critical data is protected at all times either by the secure hardware or by encryption or data signing when it is on the non-secure hardware, ensuring its trustworthiness, and fraudulent data cannot be successfully substituted therefor to gain illicit access to information or facilities by bypassing a secure biometric access system. Since session key 22 is securely maintained by secure processing hardware 26, opportunities for data tampering and compromise are minimized or eliminated.

According to one aspect of the invention, certain elements of previously described embodiments 10 and 30 are implemented on a single device or integrated circuit. For example, it may be desirable to provide a single device configured and programmed to perform all image processing and encryption/decryption (and/or signature/signature verification) functions. Such integration may apply to the above-described embodiments or any of the following described embodiments, as may be appropriate to the application thereof. In fact, one unique facet of the present invention is the ability to use the same device to encrypt (and/or sign) biometric data being sent to off-chip resources for storage and/or processing and to later decrypt (and/or verify the signature of) that same data when retrieved from said off-chip resources.

Figure 3:
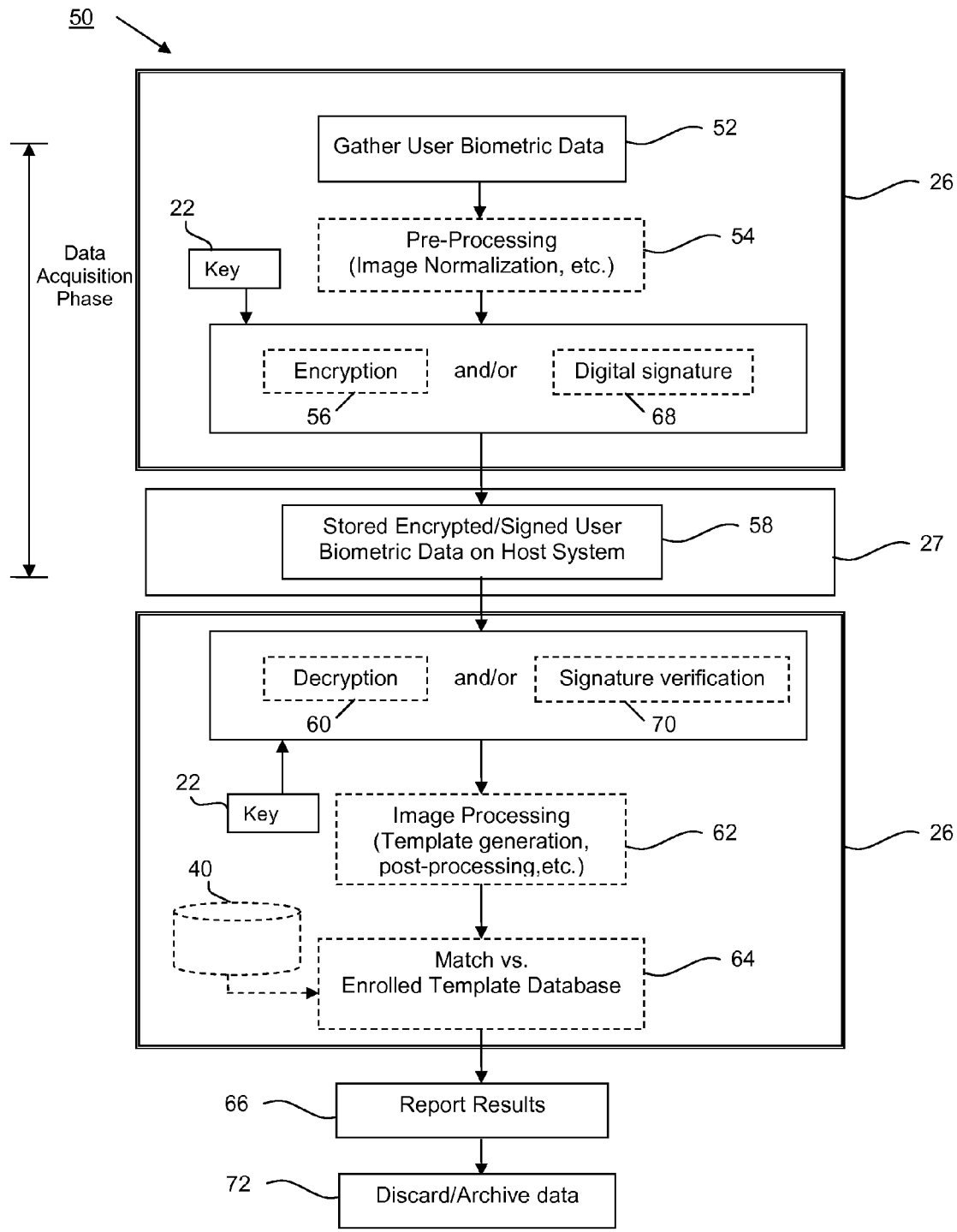
FIG. 3 illustrates a set of process steps for the application of the hardware and software illustrated in FIG. 1 and FIG. 2.

FIG. 3 illustrates the set of process steps 50 and related elements for such a combination of embodiment 10 (FIG. 1) and embodiment 30 (FIG. 2). Process 50 begins with the gathering 52 of user biometric data. Optional preprocessing may take place at step 54. The user biometric data is then encrypted at step 56 (or signed at step 68, or both encrypted and signed), and delivered to non-secure host system hardware (e.g., disk memory) where it is stored on non-secure host system 27 at step 58. When needed, such as upon completion of the gathering of data at step 52, the data is acquired from non-secure host system memory by specialized secure processing hardware 26, and decrypted at step 60 (and/or signature verification at step 70). Any image processing to support matching next takes place at step 62. The recalled user biometric data is then compared to the enrolled biometric templates stored in database 40 to determine authenticity, identity, etc., at step 64. Finally, the results of the matching at step 64 are reported for use by other hardware and/or software at step 66. Once an indication of match or no match has been made, the live data is discarded at step 72, though alternative embodiments do not preclude the storage of live data off-chip in either encrypted or unsecured/untrusted form, for example for the purposes of audit.

Figure 4:
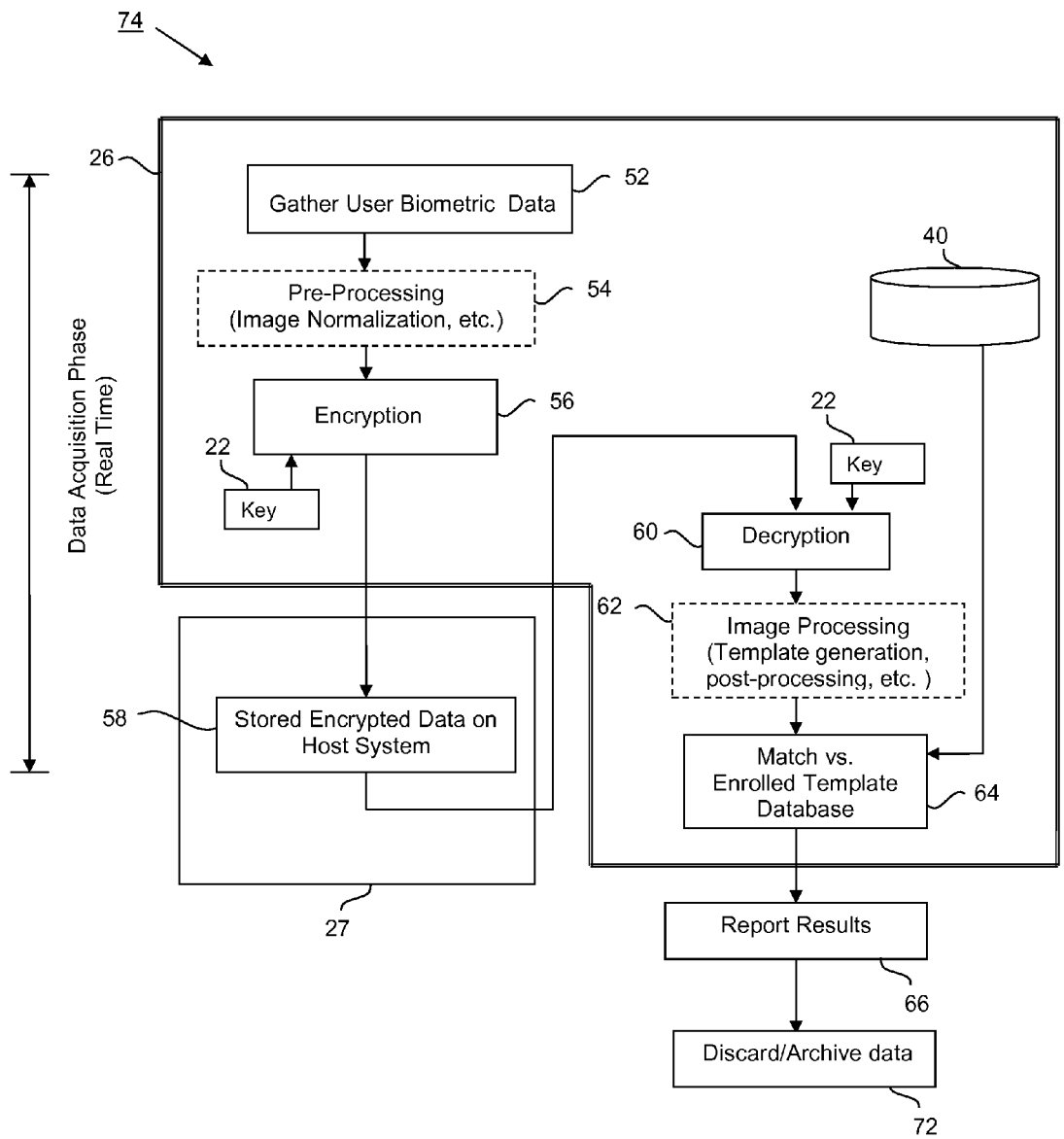
FIG. 4 is an illustration of an embodiment of the present invention representing at least a portion of the data gathering and the recall and decryption steps proceeding in parallel.

FIG. 4 is an embodiment 74 representing a variation of the embodiment 50 shown in FIG. 3. Embodiment 74 illustrates that the data gathering at step 52 and the recall and decryption at step 60 may proceed in parallel (commonly referred to as "pipelining"). While the first phase of the process of this embodiment (gather, pre-process, encrypt, store) takes place at the data acquisition rate, the second phase (recall, decryption, image processing, matching) takes place at a rate dictated primarily by the image processing step 62 and possibly also by the data matching step 64, or more generally by the overall data processing capabilities of the secure processing hardware 26.

Embodiments described thus far have relied on non-secure host system resources only for storage of encrypted user biometric data. However, non-secure host system resources can be employed in numerous additional ways to further reduce the cost and complexity of the specialized secure processing hardware, as well as the time required for image processing and analysis, and the processing demands on the secure processing hardware, etc. For example, in those cases in which the host system processor is much faster and more powerful than the processor resident on the specialized secure processing hardware, employing the host system processor can greatly accelerate the biometric data analysis. Several embodiments are next described in which non-secure host system resources are utilized to assist with and accelerate secure biometric data processing.

Figure 5:
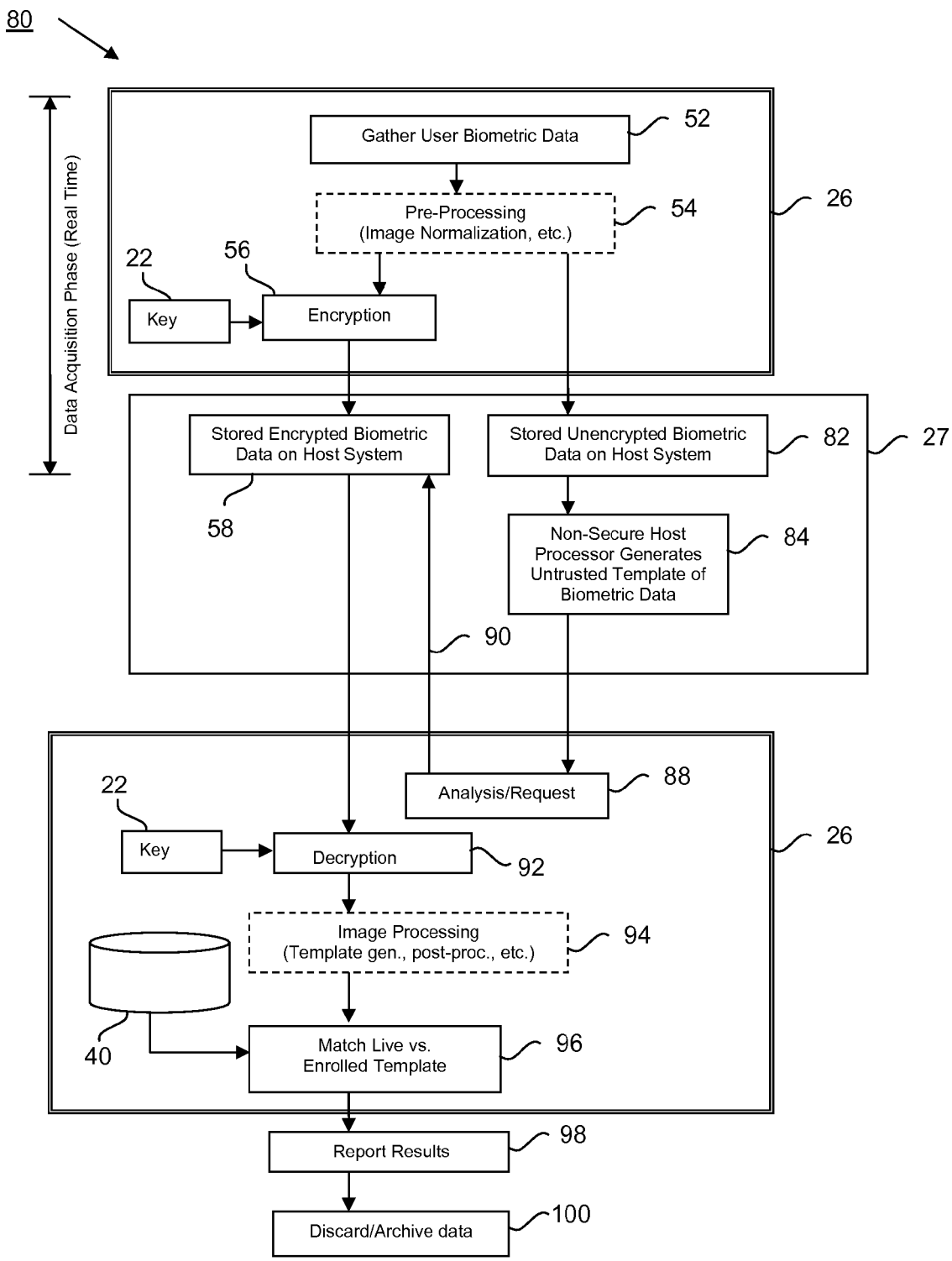
FIG. 5 illustrates an embodiment of the present invention in which the process of securely analyzing and matching the user biometric data is accelerated by employing the host system's non-secure processor to generate off-chip a non-secure (untrusted) user biometric template of the user biometric data.

According to a first such embodiment 80, as illustrated in FIG. 5, the process of securely analyzing and matching the user biometric data may be accelerated by employing the non-secure host system's processor to generate off-chip a non-secure, and hence untrusted, user biometric template of the user biometric data from an unencrypted copy of the same data delivered off-chip (and untrusted). The untrusted user biometric template can be stored off-chip, and returned to the specialized secure processing hardware on request for analysis by the on-chip secure hardware either to securely confirm the untrusted user biometric template or to more efficiently generate a trusted user biometric template from the encrypted user biometric data by focusing analysis and processing on a subset of areas identified through the untrusted user biometric template as "regions of interest", in either case resulting in a trusted user biometric template for subsequent analysis and matching on the secure processor.

Using the host processor for template confirmation or generation in this manner reduces the time, complexity, and memory requirements for the secure processor to generate a trusted user biometric template because the untrusted user biometric template can be used by the secure processor to reduce the amount of data processed in a secure manner to those 'regions of interest' which have been identified by the untrusted user biometric template. Stated in another way, the process of securely confirming from encrypted user biometric data the regions of interest and resulting user biometric template provided by non-secure processing of a non-encrypted copy of the same data will generally be more efficient and require less memory resources than securely processing all of the encrypted user biometric data to identify all regions of interest and generate the associated user biometric template from scratch.

With reference to FIG. 5, the process begins with the acquisition of user biometric data at step 52 and the preprocessing of that data at step 54, by the specialized secure processing hardware 26, as previously described. However, in parallel to the encryption of that data at step 56 and the transmission of the encrypted data to non-secure host system resources for storage at step 58, specialized secure processing hardware 26 delivers an un-encrypted user biometric data to non-secure system resources at step 82. The un-encrypted user biometric data may then be operated on by the host system processor in order to generate an untrusted user biometric template from the biometric data at step 84.

The untrusted user biometric template may be a reduced set of data, for example containing data regarding locations of interest (e.g., minutiae points) from the fingerprint. In order for the host processor to be able to generate the untrusted user biometric template, software for analysis of the user biometric data and creation of the template must be installed in the host system. According to this embodiment, the creation of the untrusted user biometric template by the non-secure host processor requires access to data in un-encrypted form, the security of which is discussed elsewhere. However, by having the host processor create the untrusted user biometric template the processing, memory, and computational demands upon the specialized secure processing hardware 26 may be significantly reduced.

The storage of the encrypted user biometric data, the unencrypted user biometric data, and the processing for the creation of the untrusted user biometric template all occur within the non-secure host system 27. However, data integrity and security are provided by further processing within specialized secure processing hardware 26. Specifically, specialized secure processing hardware 26 receives and analyzes the untrusted user biometric template at step 88. The analysis at step 88 produces a request 90 for selected portions of the encrypted user biometric data, for example, in the case of minutia-based templates, the secure processor may request from the host system 27 only those regions of user biometric data surrounding each of the individual minutia points identified in the untrusted user biometric template (since other regions of the fingerprint presumably contain no minutia points and hence do not need to be processed). The requested portions of the encrypted user biometric data are delivered by non-secure host system 27 for decryption at step 92, image post-processing at step 94, and pattern verification (e.g., matching against enrolled biometric templates stored on the specialized secure processing hardware) at step 96. The coupling between the encrypted user biometric data and the unencrypted user biometric data, as determined by the template-based on-chip request for portions of the encrypted data, ensure the legitimacy and security of the user biometric data. Once the verification takes place at step 96, the results may be reported at step 98, and the user biometric data discarded or archived off chip at steps 100, as previously described.

Accordingly, the speed and power of the non-secure host system processor can be utilized to reduce demands on the specialized secure processing hardware. Lower cost, faster, and more robust biometric data verification can be provided. The off-chip biometric data processing results in an untrusted user biometric template whose correctness can be validated through analysis of a subset of the complete user biometric data to result in a trusted user biometric template. The encrypted user biometric data for secure user template generation and later matching can be safely stored on the host system and organized for retrieval of data subsets through a suitable addressing scheme. The encrypted data subset contains features of importance (such as minutia points in the case of fingerprints) whose location can be determined from the untrusted user biometric template and whose existence and correct determination can be confirmed by the secure processor. The on-chip processing then reduces to retaining data about these points of interest from the off-chip memory and analyzing that data to confirm and subsequently match that biometric template in a secure manner. Note that to make use of data encryption techniques, either predetermined regions of data must be encrypted or other means must be provided to assure that the data has not been tampered with, including retrieving the entire image data for decryption but retaining data comprising only a single region of interest or a subset of regions of interest each time any data is retrieved by the secure biometric processing system (i.e., multiple retrievals).

Figure 6:
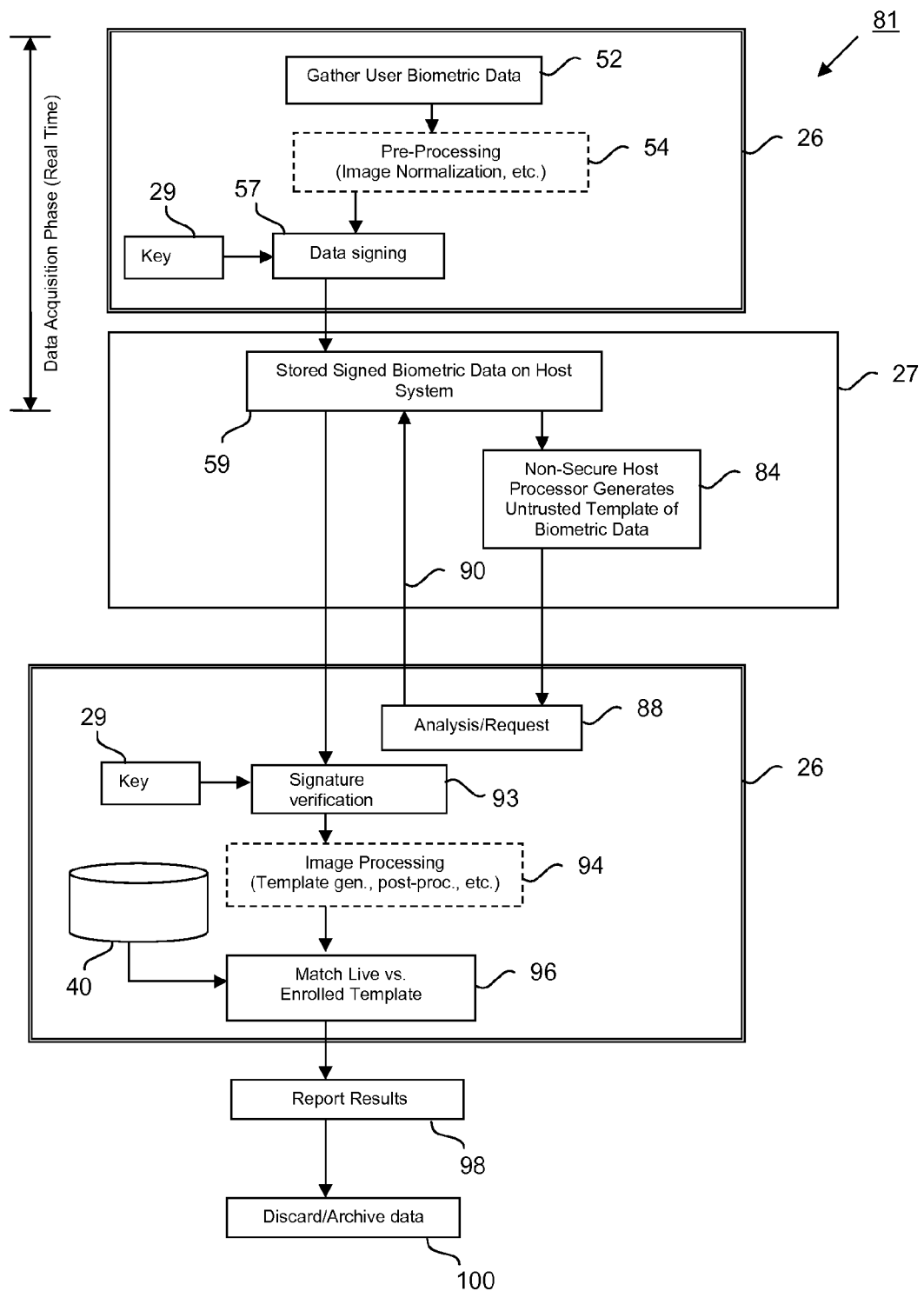
FIG. 6 illustrates a variation of the embodiment illustrated in FIG. 5, using data signing to verify authenticity of the user biometric data.

Embodiment 81 illustrated in FIG. 6 is a variation of the above-described embodiment which makes use of data signing techniques rather than encryption techniques. Data signing allows the non-secure host system 27 to access and analyze the signed user biometric data which is only possible by sending a readable copy of the user biometric data from the secure hardware 26 to the host system 27, while still ensuring that data returned from the host is trusted (a reasonable level of security depending upon the application of the present invention). In addition, data signing is generally less computationally expensive, and easier to implement for real-time performance as compared to encryption. Note that to make use of data signing techniques, either predetermined regions of data must be signed or other means must be provided to assure that the data has not been tampered with, including retrieving the entire image data for signature verification but retaining data comprising only a single region of interest or a subset of regions of interest each time any data is retrieved by the secure biometric processing system (i.e., multiple retrievals).

According to embodiment 81, a digital signature is first applied at 57 to the user biometric data. As previously mentioned, this signing may be a keyed hash of the user biometric data. The signed user biometric data is sent by specialized secure processing hardware 26 to non-secure host system 27 in the clear (that is, without encryption) for storage at 59. The session key 29 for the digital signature is known only by the specialized secure processing hardware 26. When received back from host system 27, the digital signature is verified at 93 to ensure that the data is genuine. Since no verification by host system 27 is required in this embodiment, the key 29 for the digital signature may remain secret, known only by specialized secure processing hardware 26.

Figure 7:
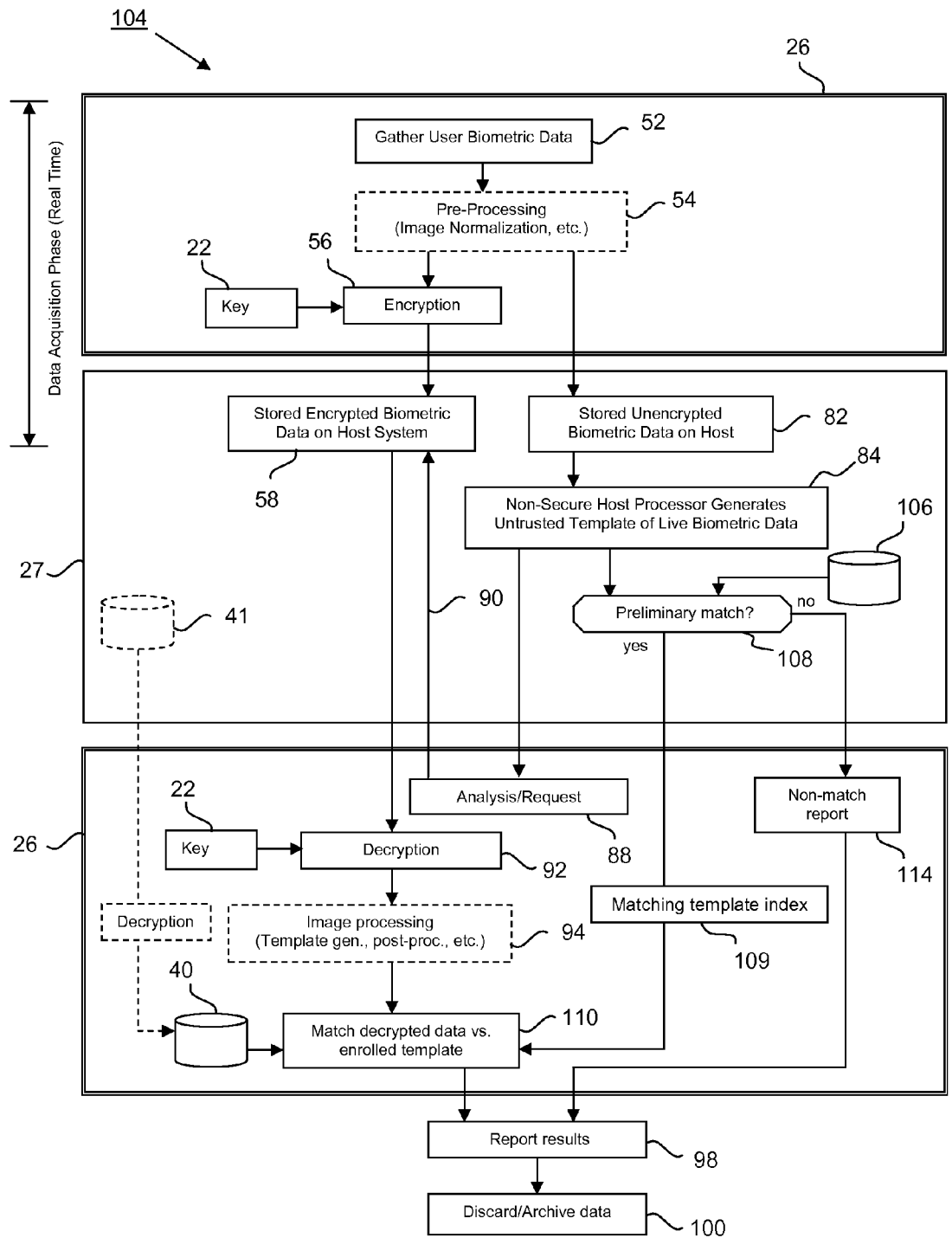
FIG. 7 illustrates an embodiment of the present invention in which non-secure host system resources are used to store the encrypted user biometric data, store non-encrypted user biometric data, generate an untrusted user biometric template, and preliminarily determine whether the untrusted biometric template is a match to an enrolled biometric template.

With reference now to FIG. 7, a further embodiment 104 of the present invention is shown. According embodiment 104, it is possible to use non-secure host system resources to store the encrypted user biometric data, store the non-encrypted user biometric data, generate an untrusted user biometric template, and further preliminarily determine whether the untrusted user biometric template is a match to any of one or more enrolled biometric templates. As shown in FIG. 7, the process again begins with the acquisition of user biometric data at step 52 and the preprocessing of that data at step 54, within the specialized secure processing hardware 26, as previously described. Non-secure host system 27 receives both encrypted user biometric data at step 58 as well as an unencrypted copy of the same user biometric data at step 82 from specialized secure processing hardware 26. The unencrypted user biometric data may then be operated on by the host system processor in order to generate the untrusted user biometric template of the user biometric data at step 84.

According to this embodiment, non-secure host system 27 further holds an enrolled template database 106, which is a unsecured off-chip replica of the secure on-chip enrolled biometric template database 40 stored within specialized secure processing hardware 26. Enrolled template database 106 is maintained by host system 27 in non-encrypted (or in-the-clear) format. Enrolled template database 106 typically consists of enrolled biometric data or enrolled biometric templates The size of the database of enrolled biometric templates can be large and the process of searching for a match can consist of exhaustively checking for the degree of matching between the acquired user biometric data and each of the enrolled biometric templates. Therefore, depending on the capability of the available computation resources, the process of checking for a match can be quite slow and can depend on the size of the enrolled biometric template database. In environments in which the processor capabilities (e.g., processing speed) of the non-secure host data processor exceeds those of the specialized secured data processor, it will be more efficient to utilize the non-secure host data processor to do exhaustive matching, which requires match computations against many or all of the data/templates in the enrolled biometric template database, and to use the secure processor to confirm a match in a trusted manner, which requires match computation against only a single enrolled biometric template from the secure on-chip enrolled biometric template database.

In addition to analyzing the user biometric data in the clear (on the non-secure host processor) to generate the untrusted user biometric template at step 84, as previously discussed, the host processor may therefore also perform a preliminary matching function in the clear, which consists of comparing at step 108 the generated untrusted user biometric template against the unsecured off-chip enrolled biometric templates stored in template database 106.

If a matching enrolled biometric template is found in template database 106, that template is identified at step 109 by the host processor to the specialized secure biometric hardware 26 as an index or template number within the database of enrolled biometric templates. (As a match/no-match outcome is reported by the secure processor, if no confirmation of a match can be made, the no-match result is typically provided to the secure hardware, for example at 114.) A request for selected encrypted user biometric data is made at step 90. Once provided to specialized secure processing hardware 26, the selected encrypted user biometric data is decrypted at step 92. Template generation and optional further image post-processing may be applied at step 94. Examples of such image post-processing include contrast enhancement, edge enhancement, etc. the use of which will depend on the application of the present invention.

Using the identified template index from step 109, a corresponding trusted biometric template is identified in the secure on-chip template database in memory 40. This template from memory 40 is compared to the trusted user biometric template at step 110 entirely within specialized secure biometric hardware 26. If an off-chip match is found, but on-chip the match can't be verified, it is concluded that there has been a compromise of data on the non-secure host system. A match on the host will always be confirmed as a match on the secure processor if there was no compromise on the host. In this way, on-chip matching is employed both efficiently and securely, utilizing guidance provided by non-secure pre-matching by the host system. The function of the secure processor shifts from searching through the template database for a match to securely confirming a positive match with a specific trusted template from the secure on-chip template database which has been identified by an index from the host. The secure biometric hardware is engaged merely to confirm a single match against the secure on-chip template database, rather than checking against all templates in the database or a large subset of the database.

It will be appreciated that in various embodiments described herein, the unsecured off-chip copy of the enrolled biometric template database must be kept perfectly synchronized with the secure-on-chip enrolled biometric template database. An example of a method for accomplishing this is to have the secure processor output an unencrypted copy of its enrolled biometric template database as part of the initialization phase of each match. The unencrypted copy may be generated at the initialization phase for each authentication session, or may be created each time the enrolled biometric template database is updated. As will be appreciated by one skilled in the art, various caching schemes can be applied to assure that a non-secure copy of the enrolled biometric template database can be maintained off chip in a synchronized manner.

According to yet another embodiment of the present invention, it is possible to use non-secure host system resources to store the encrypted user biometric data, store the non-encrypted user biometric data, generate an untrusted user biometric template, preliminarily determine whether the untrusted user biometric template is a match to an enrolled biometric template, and further store the actual secure enrolled biometric template database (as opposed to simply an unsecured copy of that database). Such an embodiment may be useful, for example, in cases in which the specialized secure processing hardware 26 is provided with little or no non-volatile memory, as may be required, for example, where it is desired to minimize the cost, size, etc. of specialized secure processing hardware 26.

Accordingly, a master secure enrolled biometric template database 41 according to this embodiment is stored off-chip in non-volatile memory and is imported into specialized secure processing hardware 26 at power up. More specifically, in order to ensure security for the master secure enrollment database, it may be stored in encrypted form within non-volatile memory resources available on non-secure host 27.

Figure 8:
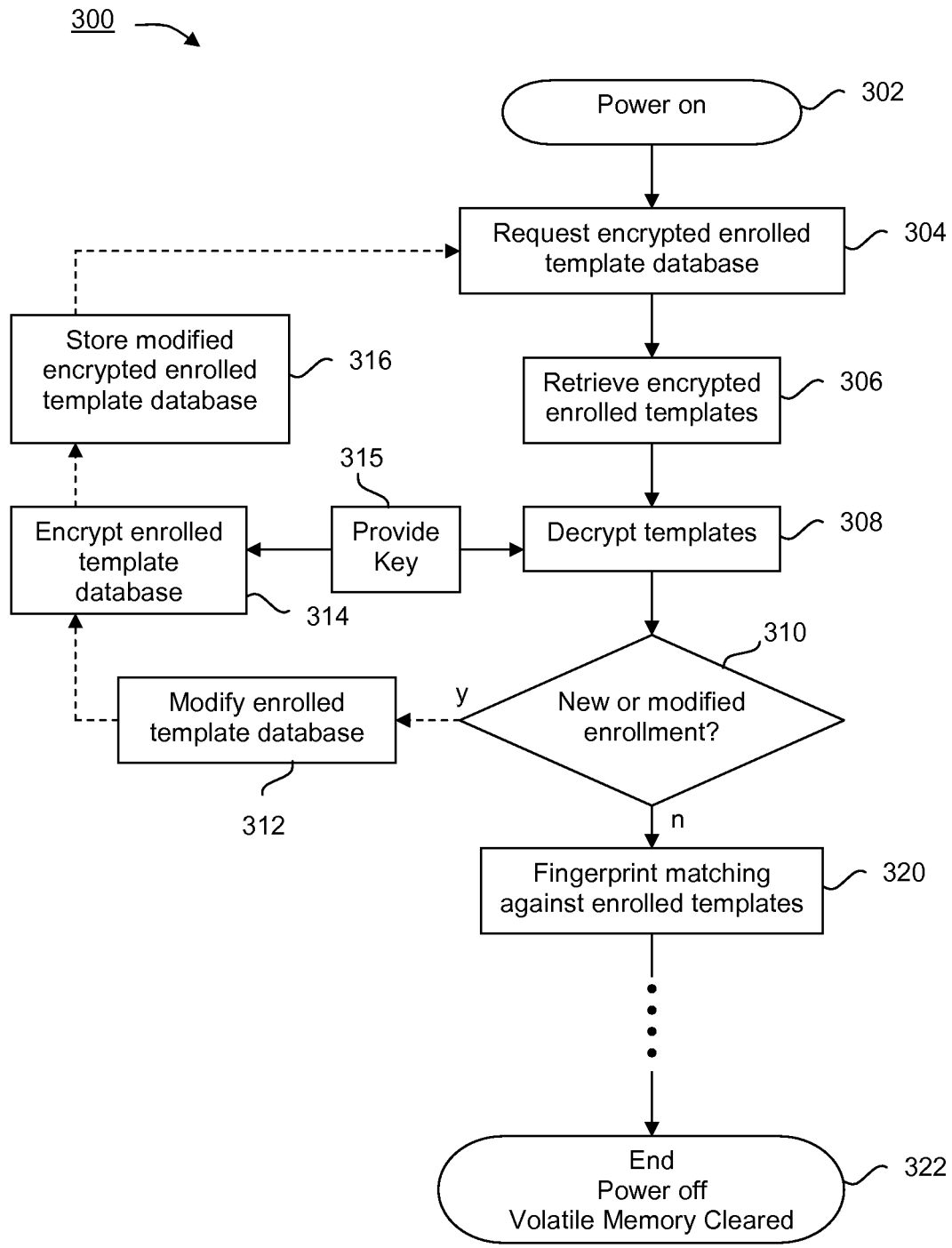
FIG. 8 is a flow chart illustrating the steps involved in securely storing an encrypted enrolled biometric template database off-chip according to one embodiment of the present invention.

FIG. 8 is a flow chart illustrating one embodiment 300 of the steps of importing the enrolled biometric template database. Upon powering up at step 306 of specialized secure processing hardware 26, a call or similar procedure 304 is initiated to retrieve from non-secure host 27 the encrypted enrolled biometric template data base, which, when retrieved, is stored in volatile memory of specialized secure processing hardware 26. Once retrieved at step 306, the encrypted enrolled biometric template database is decrypted at step 308, using the appropriate key provided at 315. At this point, there may be provided an opportunity to modify the enrolled biometric template database, such as by adding new enrolled biometric templates or removing previously enrolled biometric templates, at step 310. If the enrolled biometric template database is to be modified, the database is so modified at 312, then re-encrypted at 314, each of these steps being performed by/on specialized secure processing hardware 26. The encrypted, modified enrolled biometric template database is then re-stored at step 316 on the non-secure non-volatile memory resources, such as those available on non-secure host 27. This step may effectively overwrite the previous version of the encrypted enrolled biometric template database so that the encrypted, modified enrolled biometric template database becomes the master enrolled biometric template database, which may be returned to specialized secure processing hardware 26 upon request at step 304. If the enrolled biometric template database is not to be updated at this point, or updating is complete with no further updating required, then process 320 for determining a match between a user biometric template and an enrolled biometric template may proceed as described further below. Upon ending of the fingerprint verification session (or, for example, when the user is finished operating the personal computer, or other system within which the fingerprint identification device is operating), the specialized secure processing hardware 26 is powered off at step 322. As the enrolled biometric template database was stored in volatile memory on specialized secure processing hardware 26, the powering off process effectively erases the copy of the enrolled biometric template data base on specialized secure processing hardware 26. In one embodiment, the above process requires that a device-specific key be retained in non-volatile memory within specialized secure processing hardware 26 in order to retrieve key 22 (the actual encryption and decryption key) following power down as will be needed to permit decryption upon subsequent power up.

Security can be enhanced by using a different key each time the database is written. That is, each time the enrolled biometric template database is encrypted, a new key is generated or obtained for that encryption. That new key is stored on specialized secure processing hardware 26 until it is needed to decrypt the enrolled biometric template database at 308.

Figure 9:
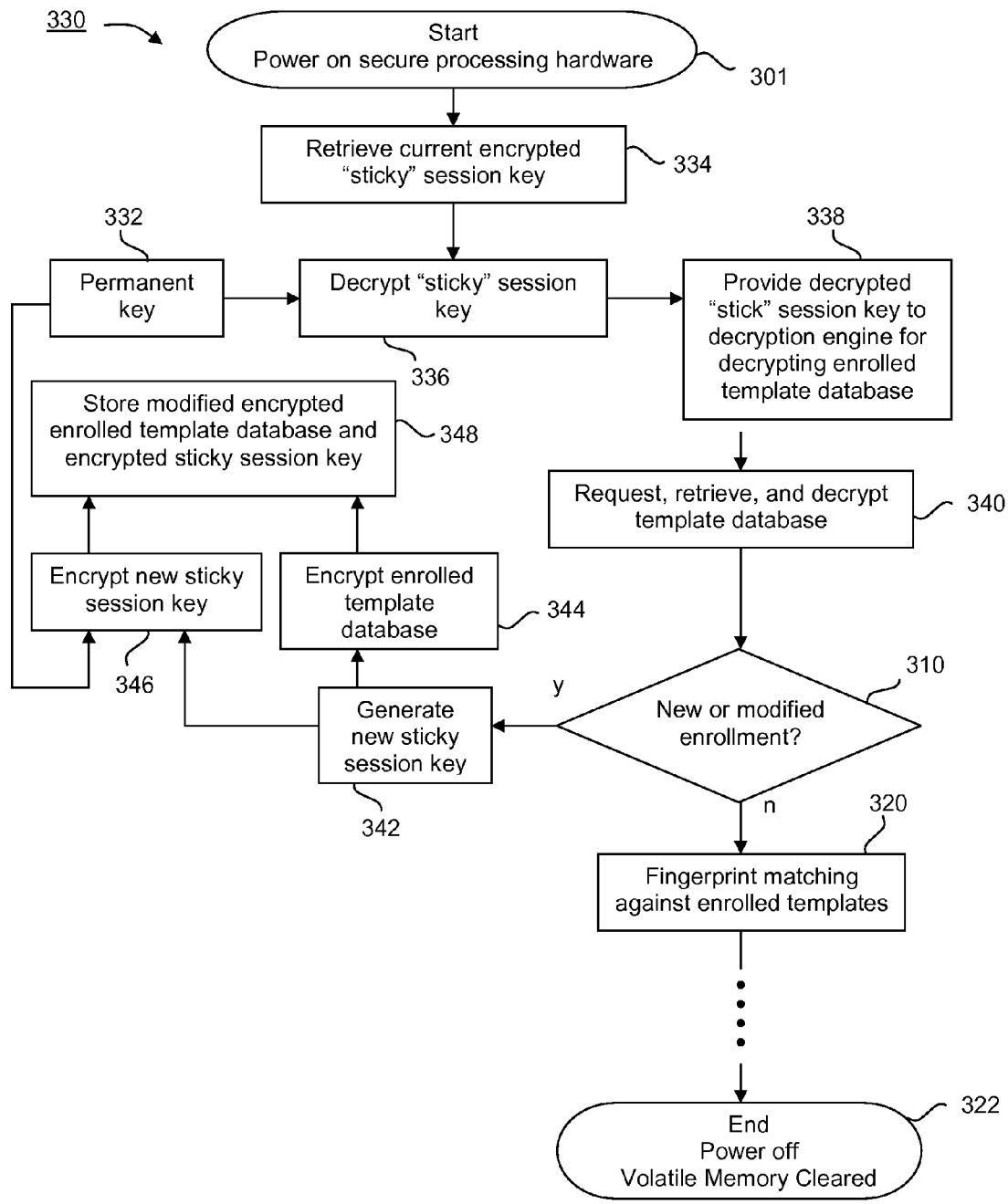
FIG. 9 is a flow chart illustrating the steps involved in securely storing an encrypted enrolled biometric template database and session key off-chip according to another embodiment of the present invention.

However, in certain embodiments it may be desirable to provide a different key to encrypt the database without requiring any re-writable non-volatile memory. An example process 330 for providing secure enrolled biometric template matching in such a case is detailed in FIG. 9. According to embodiment 330, in order to maintain security of the enrolled biometric template database and the effectiveness of the fingerprint identification system, a permanent, device-specific key 332 is built into the hardware or firmware of specialized secure processing hardware 26. Key 22 used to encrypt the enrolled biometric template database is stored in encrypted form, off chip, using the permanent key 332 for the encryption of the session key. As the session key must be available even after powering down the specialized secure processing hardware 26 in order to decrypt the enrolled biometric template database, yet must be regenerated or re-obtained each time the enrolled biometric template database changes, we refer to the session key in this case as a "sticky" session key.

Upon powering up at step 301 of a system according to this embodiment, the current sticky session key is retrieved at 334 and decrypted at 336 using the permanent key obtained at 332 by secure processing hardware 26. The sticky session key may then be used by specialized secure processing hardware for decrypting the enrolled biometric template database at step 340. With reference to FIG. 8, if the enrolled biometric template database is to be modified, the database is so modified at 312, then re-encrypted using a new sticky session key (see below) at step 314. The encrypted, modified enrolled biometric template database is then re-stored at step 316 on the non-secure memory resources, such as non-secure host 27.

With reference again to FIG. 9, in order to protect the security of the enrolled biometric template database, if enrollment is changed at 310, a new sticky session key is derived or obtained at step 342. This new sticky session key is used to encrypt the modified enrolled biometric template database at 344. The sticky session key itself is then encrypted at 346 using the permanent key from 332. The encrypted modified enrolled biometric template database and the encrypted sticky session key are then stored at 348 on the non-secure host 27 (replacing the prior versions of each). Fingerprint matching may proceed following this step at step 320 as previously described.

However, in either case, if the enrolled biometric template database is not modified in the session, or the modification process for the session is complete, then the fingerprint matching proceeds at step 320.

It will be appreciated that many variations in the processes described above are contemplated by this description. For example, depending on the application of the present invention, it may be desirable to retrieve one encrypted enrolled biometric template at a time from non-secure storage, decrypt that template using the encryption key or sticky session key, and perform a match analysis against the user biometric template obtained from the user biometric data. If a match is determined, results may be reported. If a match is not determined, the next enrolled encrypted biometric template may be retrieved and decrypted, and so on. In such a case, the aforementioned processes apply on a template-by-template basis as opposed to a whole-database basis. Note that to make use of single-template retrieval from a template database which has been secured through encryption and/or data signing prior to storage in non-secure off-chip memory, either each individual template in the database must be encrypted and/or signed using the same key independently or other means must be provided to assure that the individual template has not been tampered with, including retrieving the entire template database for decryption and/or signature verification but retaining only the single template which is desired (i.e., multiple retrievals).

Figure 10:
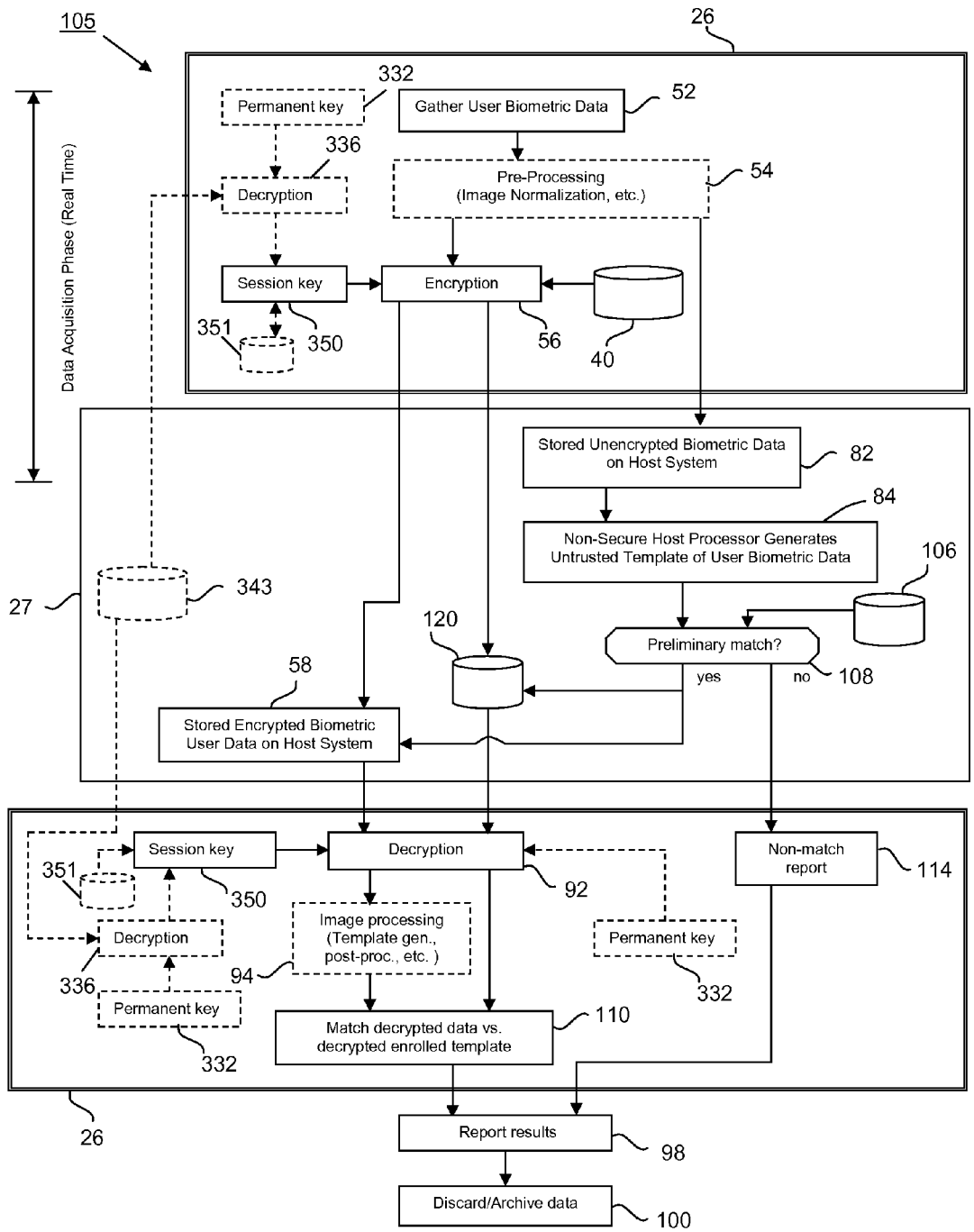
FIG. 10 illustrates an embodiment of the present invention in which non-secure host system resources are used to store the encrypted user biometric data, store the non-encrypted user biometric data, generate an untrusted user biometric template, store the actual enrolled biometric template database (as opposed to simply a copy of that database), and preliminarily determine whether the untrusted user biometric template is a match to an enrolled biometric template.

With reference now to FIG. 10, yet another embodiment 105 of the present invention begins with the acquisition of user biometric data at step 52 and the preprocessing of that data at step 54, within the specialized secure processing hardware 26. Specialized secure processing hardware 26 delivers un-encrypted user biometric data to non-secure system resources at step 82. The un-encrypted user biometric data may then be operated on by the non-secure host system processor in order to generate the untrusted user biometric template from the user biometric data at step 84. Specialized secure processing hardware 26 also encrypts the user biometric data at step 56 utilizing a separate session key (not shown).

According to this embodiment, host system 27 includes not only the non-encrypted enrolled biometric template database 106, as previously described, but also an encrypted version 120 of the enrolled biometric template database 40, encrypted using the sticky session key as previously described. According to one aspect of this embodiment a device-specific permanent encryption key is provided at 332, retained within specialized secure processing hardware 26, in addition to a sticky session key at 350 obtained by decrypting the encrypted version of same sticky session key stored in memory 343 on non-secure host 27 due, for example, to insufficient non-volatile memory resources being available on specialized secure processing hardware 26, as previously described. Alternatively, non-volatile memory 351 may be provided to retain the sticky session key exclusively on-chip, in which case device-specific permanent key 332 is not required.

As previously described, the untrusted user biometric template generated at step 84 is compared at step 108 to the entries comprising the unsecured database of enrolled biometric templates 106 in a non-secure environment. If no match is found, a no-match report is issued at 114, the results issued at 98 for use outside of secure processing hardware 26, and the user biometric data discarded at 100 (or alternatively saved for audit purposes). However, if a preliminary match is identified at step 108, the encrypted (trusted) user biometric data at 58 is retrieved by specialized secure processing hardware 26. Furthermore, the specific encrypted enrolled biometric template corresponding to the non-encrypted template identified as a preliminary match at step 108 (or alternatively an identification or index of that template used for retrieval of that template as per the prior embodiment along with the actual encrypted enrolled biometric template database which may be concurrently retrieved or may alternatively have been previously retrieved and retained) is also retrieved by specialized secure processing hardware 26. At 92 the encrypted user biometric data is decrypted (using the session key at 350) and the encrypted enrolled biometric template is decrypted (using either the device-specific permanent key at 332 or the sticky session key at 350) (or alternatively, the index of the matching template can be used to retrieve that template as per the prior embodiment from the encrypted enrolled biometric template database which may be concurrently decrypted or may alternatively have been previously retrieved, decrypted and retained). Image post-processing may then optionally be performed on the decrypted user biometric data at step 94. The decrypted and processed user biometric template is then compared to the decrypted enrolled biometric template at step 110 to verify the match. Importantly, this final comparison takes place in a secure fashion completely within the specialized secure processing hardware 26. The results of the comparison are output at step 98, and the user biometric data discarded at step 100 (or alternatively saved for audit purposes).

Thus, according to this embodiment, the host processor can directly return the specific encrypted enrolled biometric template which is expected to best match the user biometric data. The secure biometric processor can then confirm the analysis of the host processor by retrieving the necessary secure user biometric data from the host system memory (which has been encrypted and/or signed with the secret (or private) session key known only to the secure biometric processor).

It will also be appreciated by one skilled in the art that a device-specific permanent key 332 may be used to securely encrypt the off-chip enrollment database without making use of a sticky key and session keys. In this case, the off-chip database will always be encrypted and decrypted using a device-specific (e.g., unique from device to device) permanent key.

Figure 11:
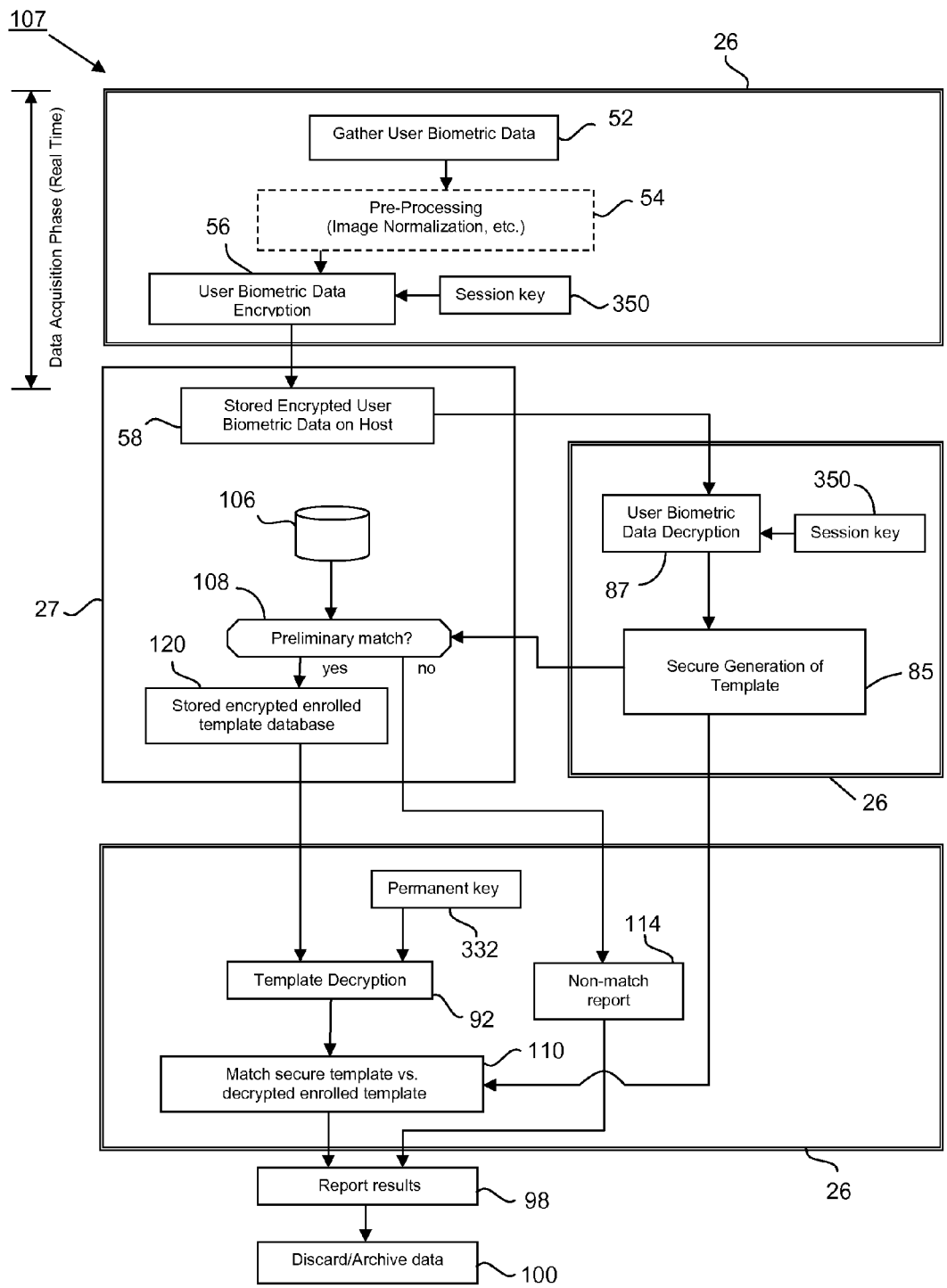
FIG. 11 illustrates a variation of the embodiment of FIG. 10 in which template generation takes place in a secure manner on-chip.

Due to privacy concerns it is often necessary to avoid processing of user biometric data (as compared to a user template) on the non-secure processor altogether. According to a variation 107 shown in FIG. 11, the non-secure host 27 is utilized solely for secure and non-secure storage, as well as optional match acceleration through template processing (i.e., template generation is only performed securely on chip). This embodiment employs secure storage through encryption of the user biometric data for later retrieval and processing by the secure processor to securely (and privately) determine the user biometric template.

According to this embodiment, acquisition and pre-processing of user biometric data is as previously described, followed by use of a session key 350 for real-time encryption of user biometric data by encryption engine 56 and transfer of the encrypted end user data to host system 27 for storage within host system memory 58. Specialized secure processing hardware 26 then securely generates a user biometric template at 85, using the unencrypted user biometric data which has been retrieved from host system memory 58 and decrypted by user biometric data decryption engine 87 using session key 350. The biometric template is then communicated to the host system 27 in the clear. Preliminary database matching is performed by host system 27 against an unencrypted copy of the enrolled biometric template database. The match is subsequently confirmed by the secure processor 26 against the enrolled biometric template identified by the host (either from a secure on-chip enrolled biometric template or through a secured off-chip enrolled biometric template retrieved from the host and decrypted through device-specific permanent key 332 (or a sticky session key as described above) using the mechanism described above). Note that in this embodiment the advantages of reducing on-chip memory and accelerating database search through the use of host resources is achieved without compromising the security of the system and without allowing live user biometric data to be made available in the clear to the non-secure host. This offers certain advantages in terms of privacy because only a template based on the user's biometric data, and not the actual user biometric data itself, is available in readable form within non-secure host processor 27.

Figure 12:
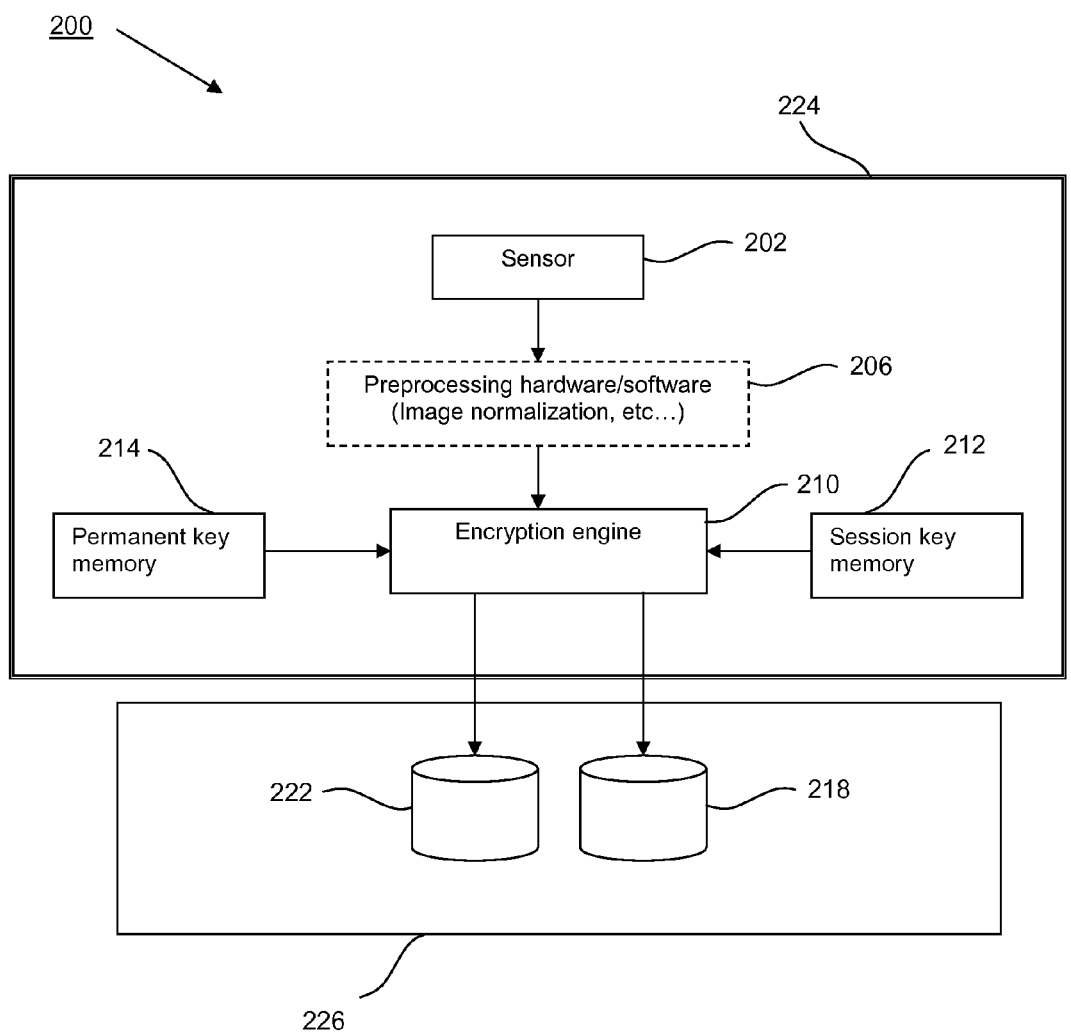
FIG. 12 is an illustration of an embodiment of hardware and software supporting the data acquisition phase of the process described and shown in FIG. 10.
Figure 13:
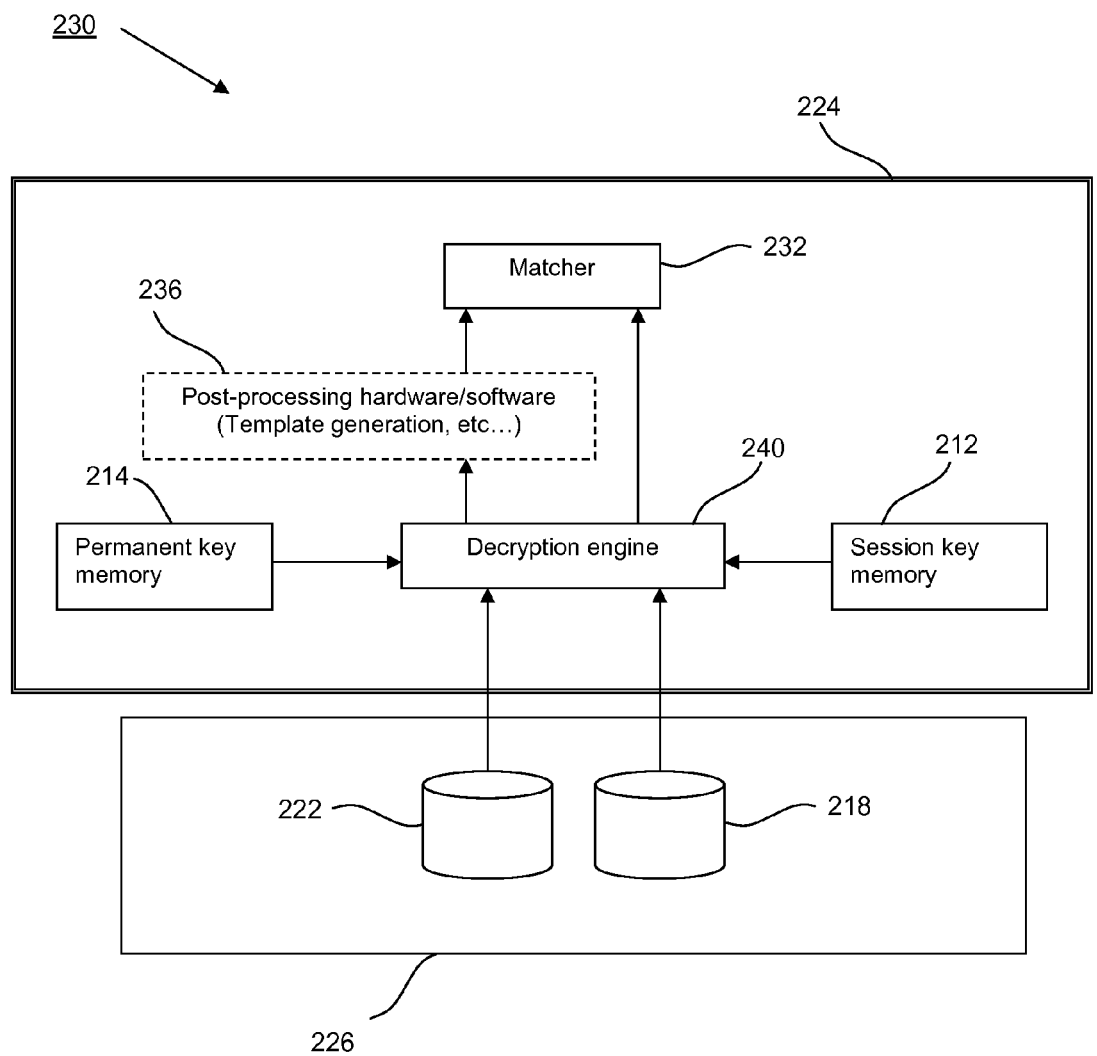
FIG. 13 is an illustration of an embodiment of hardware and software supporting the data analysis phase of the process described and shown in FIG. 10.

FIGS. 12 and 13 detail the structural aspects of system 200, 230 for implementing the embodiments of the present invention. Sensor 202 may be any of a wide variety of biometric sensor hardware and associated driver software and interfaces, such as optical and electrical sensors including the aforementioned scanning capacitive semiconductor fingerprint detector disclosed in U.S. Pat. No. 6,580,816. Template generator (and optional image processor) hardware and software 206, template generator (and optional image processor) hardware and software 236, matcher hardware and software 232, and encryption engine 210 and decryption engine 240 may be dedicated hardware or programmed general purpose hardware with appropriate software or firmware. Key memory 212, 214 may be solid state memory (as the storage requirements for these elements is typically comparatively small), while system memory 218, 222 may be solid state, permanent or removable magnetic, optical, magneto-optical, etc. disk media, etc. Some or all of specialized secure processing hardware 224 may be comprised of discrete elements or may comprise a system-on-a-chip integrated circuit. Preferably, specialized secure processing hardware 224 is compact with low power requirements for integration into laptop computers, removable storage devices, mobile telephones, vehicles, etc. as well as into more stationary applications such as desktop computers and servers, facility access controls (e.g., door locks, etc.). Host system resources 226 may be a personal computer, server, a network of communicatively connected elements, or other system typically having a lower level of security (or no security per se) but generally higher data processing capabilities and memory resources as compared to specialized secure processing hardware 224.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way.

For example, the techniques to securely make use of off-chip volatile memory for analyzing and matching of user biometric data and to securely make use of off-chip non-volatile memory for the use of storing the enrolled biometric template database within the host system are independent, and each can be used with or without the other. Hence, the present invention also foresees the possibility of using the described technique to securely make use of the off-chip non-volatile memory to reduce the need for secure on-chip non-volatile memory within the secure subsystem hardware only. This embodiment can be attractive for systems in which the size of the enrolled biometric template database is large and/or the cost of secure non-volatile memory is high compared to the cost of secure volatile memory (or working memory) required for analysis and matching of the user biometric data.

It will also be appreciated that the methods, in the form of instructions having a sequence, syntax, and content, of the present invention may be stored on (or equivalently, in) any of a wide variety of computer-readable media such as magnetic media, optical media, magneto-optical media, electronic media (e.g., solid state ROM or RAM), etc., the form of which media not limiting the scope of the present invention. A computer reading said media is operable to either transfer (e.g., download) said instructions thereto and then operate on those instructions, or cause said instructions to be read from the media and operate in response thereto. Furthermore, devices (e.g., a reader) for accessing the instructions on said media may be contained within or connected directly to the computer on which those instructions operate, or may be connected via a network or other communication pathway to said computer.

Finally, it will be appreciated that there is no express or implied limit to the form or type of devices employing any method or apparatus of any embodiment described or claimed herein. For example, such off-chip resources may be used be devices incorporated into laptop computers, desktop or workstation computers, cellular telephones, personal digital assistants, etc. using an integrated or peripheral biometric data sensor. Furthermore, communications between such devices and their non-secure host systems may be hard-wired or wireless without materially affecting the nature of the present invention.

Therefore, the foregoing detailed description provides those of ordinary skill in the art with a convenient guide for implementation of the invention, by way of examples, and contemplates that various changes in the functions and arrangements of the described embodiments may be made without departing from the spirit and scope of the invention defined by the claims thereto.

What is claimed is:

1. A biometric authentication system comprising:
   a host device including a host memory storing therein an encrypted database including a plurality of enrolled encrypted biometric templates and an un-encrypted database including a plurality of enrolled un-encrypted biometric templates; and
   a system-on-chip biometric device in communication with said host device and including
      a biometric data acquisition module generating user biometric data,
      a biometric data encryption engine encrypting the user biometric data,
      a biometric data decryption engine, and
      a non-volatile key storage memory coupled to said biometric data encryption and decryption engines and storing a key for use by said biometric data encryption and decryption engines in encrypting and decrypting the user biometric data,
      the key being permanently stored in said non-volatile key storage memory, and being inaccessible outside of said system-on-chip biometric device;
   said system-on-chip biometric device
      transferring the un-encrypted user biometric data to said host device,
      transferring the encrypted user biometric data to said host device, and
      causing said host device to store the encrypted user biometric data on said host memory in the encrypted database;
   said system-on-chip biometric device cooperating with said host device to cause said host device to
      operate on the un-encrypted user biometric data to generate an untrusted user biometric template,
      store the untrusted user biometric template in the un-encrypted database on said host memory and verify the untrusted user biometric template as trusted based upon a region of interest,
      compare the untrusted user biometric template to entries in the un-encrypted database, and
      when a match is not found, a user is not authenticated, and when the match is found, said system-on-chip biometric device to
         recall an enrolled encrypted biometric template corresponding to the enrolled un-encrypted biometric template identified as the match and recall the stored encrypted user biometric data from said host device,
         decrypt the recalled enrolled encrypted biometric template and the recalled stored encrypted user biometric data using said biometric data decryption engine,
         after decrypting compare the decrypted user biometric data to the decrypted enrolled biometric template, and
         when a match is found, the user is authenticated.

2. The system of claim 1 wherein said system-on-chip biometric device further comprises a pre-processing module coupled to said biometric data acquisition module and said biometric data encryption engine and processing the user biometric data prior to encryption.

3. The system of claim 1 wherein said biometric data acquisition module comprises a fingerprint scanner determining characteristics of a user fingerprint and generating the user biometric data therefrom.

4. The system of claim 1 wherein the user biometric data comprises a two-dimensional image of a user fingerprint.

5. A biometric authentication system comprising:
a host device including a host memory storing therein an encrypted database including a plurality of encrypted enrolled biometric templates and an un-encrypted database including a plurality of enrolled un-encrypted biometric templates; and
a system-on-chip biometric device in communication with said host device and including
a biometric data acquisition module generating user biometric data,
a biometric data encryption engine encrypting the user biometric data,
a biometric data decryption engine,
a non-volatile key storage memory coupled to said biometric data encryption and decryption engines and storing a key for use by said biometric data encryption and decryption engines in encrypting and decrypting the user biometric data,
the key being permanently stored in said non-volatile key storage memory, and being inaccessible outside of said system-on-chip biometric device,
a secure biometric template generator coupled to said biometric data decryption engine and generating a user biometric template from the encrypted user biometric data received from said host memory and decrypted by said biometric data decryption engine, and
a matcher module coupled to said secure biometric template generator;
said system-on-chip biometric device
transferring the un-encrypted user biometric data to said host device,
transferring the encrypted user biometric data to said host device, and
causing said host device to store the encrypted user biometric data in the encrypted database on said host memory;
said system-on-chip biometric device cooperating with said host device to cause said host device to
operate on the un-encrypted user biometric data to generate an untrusted user biometric template,
store the untrusted user biometric template in the un-encrypted database on said host memory and verify the untrusted user biometric template as trusted based upon a region of interest,
compare the untrusted user biometric template to entries in the un-encrypted database, and
when a match is not found, a user is not authenticated, and when the match is found, said system-on-chip biometric device to
recall an enrolled encrypted biometric template corresponding to the enrolled un-encrypted biometric template identified as the match and recall the stored encrypted user biometric data from said host device,
decrypt the recalled enrolled encrypted biometric template and the recalled stored encrypted user biometric data using said biometric data decryption engine,
after decrypting,
compare the decrypted user biometric data to the decrypted enrolled biometric template, and
when a match is found, the user is authenticated.

6. The system of claim 5 wherein said system-on-chip biometric device further comprises a pre-processing module coupled to said biometric data acquisition module and said biometric data encryption engine and processing the user biometric data prior to encryption.

7. The system of claim 5 wherein said biometric data acquisition module comprises a fingerprint scanner determining characteristics of a user fingerprint and generating the user biometric data therefrom.

8. The system of claim 5 wherein the user biometric data comprises a two-dimensional image of a user fingerprint.

9. A method of biometric authentication comprising:
using a system-on-chip biometric device in communication with a host device to generate user biometric data, and to encrypt the user biometric data, the host device including a host memory storing therein an encrypted database including a plurality of enrolled encrypted biometric templates and an un-encrypted database including a plurality of enrolled un-encrypted biometric templates;
permanently storing a key in a non-volatile key storage memory of the system-on-chip biometric device, the key being for use by biometric data encryption and decryption engines in the system-on-chip biometric device encrypting and decrypting the user biometric data at the system-on-chip biometric device, the key being inaccessible outside of the system-on-chip biometric device;
transferring the un-encrypted user biometric data to the host device;
transferring the encrypted user biometric data to the host device from the system-on-chip biometric device;
storing the encrypted user biometric data in the encrypted database; and
using the system-on-chip biometric device cooperating with the host device to cause the host device to
operate on the un-encrypted user biometric data to generate an untrusted user biometric template,
store the untrusted user biometric template in the un-encrypted database on the host memory and verify the untrusted user biometric template as trusted based upon a region of interest,
compare the untrusted user biometric template to entries in the un-encrypted database, and
when a match is not found, a user is not authenticated, and when the match is found, the system-on-chip biometric device to
recall an enrolled encrypted biometric template corresponding to the enrolled un-encrypted biometric template identified as the match and recall the stored encrypted user biometric data from the host device,
decrypt the recalled enrolled encrypted biometric template and the recalled stored encrypted user biometric data,
after decrypting, compare the decrypted user biometric data to the decrypted enrolled biometric template, and
when a match is found, the user is authenticated.

10. The method of claim 9 further comprising pre-processing the user biometric data prior to encryption.

11. The method of claim 9 further comprising generating the user biometric data based upon characteristics of a user fingerprint.

12. The method of claim 9 wherein the user biometric data comprises a two-dimensional image of a user fingerprint.

* * * * *